(12) United States Patent
Arnold et al.

(10) Patent No.: US 10,592,012 B2
(45) Date of Patent: Mar. 17, 2020

(54) FIVE-RECTANGLE METHOD FOR DISPATCHING TOUCH EVENTS FROM MOTION-DISABLED USERS

(71) Applicants: Mark Gordon Arnold, Laramie, WY (US); Jay Bishop, Cheyenne, WY (US); Andrew Hess, Aurora, CO (US)

(72) Inventors: Mark Gordon Arnold, Laramie, WY (US); Jay Bishop, Cheyenne, WY (US); Andrew Hess, Aurora, CO (US)

( * ) Notice: Subject to any disclaimer, the term of this patent is extended or adjusted under 35 U.S.C. 154(b) by 0 days.

(21) Appl. No.: 15/932,139

(22) Filed: Feb. 7, 2018

(65) Prior Publication Data

US 2019/0243467 A1   Aug. 8, 2019

(51) Int. Cl.
| | |
|---|---|
| *G06F 3/038* | (2013.01) |
| *G06F 3/0488* | (2013.01) |
| *G06F 3/0481* | (2013.01) |
| *G06F 3/041* | (2006.01) |
| *G06F 3/0362* | (2013.01) |
| *G06F 3/039* | (2013.01) |
| *G06F 3/044* | (2006.01) |

(52) U.S. Cl.
CPC ............ *G06F 3/038* (2013.01); *G06F 3/0362* (2013.01); *G06F 3/0393* (2019.05); *G06F 3/0416* (2013.01); *G06F 3/0442* (2019.05); *G06F 3/04186* (2019.05); *G06F 3/04812* (2013.01); *G06F 3/04883* (2013.01); *G06F 3/044* (2013.01); *G06F 2203/04114* (2019.05); *G06F 2203/04806* (2013.01); *G06F 2203/04808* (2013.01)

(58) Field of Classification Search
CPC ....................................................... G06F 3/038
See application file for complete search history.

(56) References Cited

U.S. PATENT DOCUMENTS

| | | | | |
|---|---|---|---|---|
| 8,094,133 B2* | 1/2012 | Sato | ......... | G06F 3/044 345/173 |
| 8,125,469 B2* | 2/2012 | Badaye | ......... | G06F 3/044 178/18.01 |
| 8,528,117 B2* | 9/2013 | Asiaghi | ......... | G06F 3/014 2/159 |
| 8,564,553 B2* | 10/2013 | Yeh | ......... | G06F 3/044 178/18.06 |

(Continued)

*Primary Examiner* — Jason C Olson

(57) ABSTRACT

A method using hardware button(s) dispatches gestures for motion-disabled users. It displays a translucent layer, on top of underlying applications, which intercepts user touch events (preventing inadvertent gestures) and modifies (x',y') based on dampened differences of most recent intercepted event coordinates (swabs). The method operates in three modes identified by translucent colors and/or digits (how many button pushes before invocation): mode 1 dispatches short taps at (x',y'); mode 2 displays extending arrow while the user swabs (x',y') until the second push, which dispatches scrolling in arrow direction; mode 3 creates an arrow and pivot. Pivot size and color indicate magnification/demagnification. The third push dispatches zooming when pivot and arrow are collinear; otherwise it dispatches rotation. A special case of mode 2 dispatches a long tap. In one embodiment, dispatched gestures are allowed through a momentary hole centered at (x',y') surrounded by four other rectangles in the translucent layer.

21 Claims, 15 Drawing Sheets

(56) References Cited

U.S. PATENT DOCUMENTS

| | | | | |
|---|---|---|---|---|
| 8,648,837 B1* | 2/2014 | Tran | ............... | G06F 3/0416 178/19.01 |
| 8,766,543 B1* | 7/2014 | Janning | ............... | H05B 33/083 315/122 |
| 8,803,844 B1* | 8/2014 | Green | ............... | G06F 3/044 345/174 |
| 8,947,405 B2* | 2/2015 | Cho | ............... | G06F 1/1626 178/19.03 |
| 9,110,523 B2* | 8/2015 | Mann | ............... | G06F 3/0383 |
| 2005/0231471 A1* | 10/2005 | Mallard | ............... | A41D 19/0024 345/156 |
| 2009/0167727 A1* | 7/2009 | Liu | ............... | G06F 3/03545 345/179 |
| 2009/0211821 A1* | 8/2009 | Yeh | ............... | G06F 3/03545 178/19.03 |
| 2009/0256824 A1* | 10/2009 | Hainzl | ............... | G06F 3/03545 345/179 |
| 2010/0053113 A1* | 3/2010 | Wu | ............... | G06F 3/03545 345/174 |
| 2010/0053120 A1* | 3/2010 | Chang | ............... | G06F 3/03545 345/179 |
| 2011/0234623 A1* | 9/2011 | Ure | ............... | G06F 3/03545 345/592 |
| 2011/0248946 A1* | 10/2011 | Michaelis | ............... | A61F 4/00 345/174 |
| 2011/0285671 A1* | 11/2011 | Wu | ............... | G06F 3/0487 345/179 |
| 2011/0304577 A1* | 12/2011 | Brown | ............... | G06F 3/03545 345/174 |
| 2012/0242618 A1* | 9/2012 | Everest | ............... | G06F 3/039 345/174 |
| 2013/0106714 A1* | 5/2013 | Shahparnia | ............... | G06F 1/3203 345/173 |
| 2013/0127791 A1* | 5/2013 | Siuta | ............... | G06F 3/03545 345/179 |
| 2013/0234986 A1* | 9/2013 | Elias | ............... | G06F 3/03545 345/174 |
| 2013/0257804 A1* | 10/2013 | Vu | ............... | G06F 3/044 345/174 |
| 2013/0268094 A1* | 10/2013 | Van Wiemeersch | ............... | A61F 2/54 623/57 |
| 2014/0104224 A1* | 4/2014 | Ih | ............... | G06F 3/044 345/174 |
| 2018/0113600 A1* | 4/2018 | Seymour | ............... | G06F 3/04845 |

* cited by examiner

FIVE-RECTANGLE METHOD FOR DISPATCHING TOUCH EVENTS FROM MOTION-DISABLED USERS

BACKGROUND-PRIOR ART

The following is a tabulation of some of the prior art that appears relevant:

U.S. Patents

| Patent Number | Kind Code | Issue Date | Patentee |
| --- | --- | --- | --- |
| 9,110,523 | B2 | 2015 Aug. 18 | Mann |
| 8,947,405 | B2 | 2015 Feb. 3 | Cho, et al. |
| 8,803,844 | B1 | 2014 Aug. 12 | Green, et al. |
| 8,766,543 | B2 | 2014 Jul. 1 | Vuppu, et. al. |
| 8,648,837 | B2 | 2014 Feb. 11 | Tran, et al. |
| 8,564,553 | B2 | 2013 Nov. 22 | I-Hau Yew, et al. |
| 8,528,117 | B2 | 2013 Sep. 10 | Asiaghi |
| 8,125,469 | B2 | 2012 Feb. 28 | Badeye, et al. |
| 8,094,133 | B2 | 2010 Mar. 18 | Sato, et al., |

U.S. Patent Application Publications

| Patent Number | Kind Code | Publ. Date | Applicant |
| --- | --- | --- | --- |
| 20140104224 | A1 | 2014 Apr. 17 | Ih, et al. |
| 20130268094 | A1 | 2013 Oct. 10 | Wiemeersch,et al. |
| 20130257804 | A1 | 2013 Oct. 3 | Vu, et al. |
| 20130234986 | A1 | 2013 Sep. 12 | Elias |
| 20130127791 | A1 | 2013 May 23 | Siuta |
| 20130106714 | A1 | 2013 May | Shahparnia |
| 20120242618 | A1 | 2012 Sep. 27 | Everest, et al. |
| 20110304577 | A1 | 2011 December | Brown |
| 20110285671 | A1 | 2011 Nov. 24 | Wu, et al. |
| 20110248946 | A1 | 2011 October | Michaelis |
| 20110234623 | A1 | 2011 Sep. 29 | Ure |
| 20100053113 | A1 | 2010 Mar. 4 | Wu, et al. |
| 20100053120 | A1 | 2010 Mar. 4 | Chang, et al. |
| 20090256824 | A1 | 2009 Oct. 15 | Hanizl, et al. |
| 20090211821 | A1 | 2009 Aug. 27 | Yy-Cho Yee |
| 20090167727 | A1 | 2009 Jul. 2 | Yi-Ching Liu, et al. |
| 20050231471 | A1 | 2005 Oct. 20 | Mallard, et al. |

Foreign Patent Documents

| Foreign Doc. Nr. | Cntry Code | Kind Code | Pub. Date | App. or Patentee |
| --- | --- | --- | --- | --- |
| 2662754 | EP | A1 | 2013 Nov. 13 | Bespertov |
| 2012177573 | WO | A2 | 2012 Dec. 27 | Harley |
| 2230589 | EP | A1 | 2010 September | Daniel |

NONPATENT LITERATURE DOCUMENTS

D. A. Bowman, "Novel uses of Pinch Gloves™ for virtual environment interaction techniques," *Virtual Reality*, vol. 6, no. 3, pp. 122-129, 2002 and http://www.fakespacelabs.com/tools.html www.virtex.com J. Perng, et al., "Acceleration sensing glove (ASG)", *The Third International Symposium on Wearable Computers (ISWC'99)*, pp. 178-180, 1999

J. S. Zelek, et al., "A haptic glove as a tactile-vision sensory substitution for wayfinding". *Journal of Visual Impairment and Blindness*, Vol. 97, No. 10, pp. 621-632, 2003

J. Webster, J. *Medical Instrumentation:Application and Design*. John Wiley & Sons, Inc., 1998

R. W. Picard and J. Scheirer, "The galvactivator: A glove that senses and communicates skin conductivity", *Proceedings 9th Int. Conf. on HCI*, August 2001

"Accessibility added to Kindle Fire as blind group plans protest", http://www.mediaaccess.org.au/latest_news/general/accessibility-added-to-kindle-fire-as-blind-group-plans-protest.

http://www.wireless.att.com/learn/articles-resources/disability-resources/mobile-speak-magnifier.jsp http://www.parkinsons.org.uk/content/easycall-free-mobile-app-people-parkinsons.

C. Wacharamanotham, et al., "Evaluating swabbing: a touchscreen input method for elderly users with tremor", *SIGCHI Conference on Human Factors in Computing (CHI11)*, pp. 623-626, 2011. H http://web.archive.org/web/20131018005240/http://www.n-trig.com/Data/Uploads/Misc/DuoSense%20Digitizer_February%202012.pdf http://web.archive.org/web/20121025064503/http://aiptek.eu/index.php/en/products/graphics-tablets-a-digital-pens/digital-pens/mynote-pen http://developer.android.com/guide/topics/ui/accessibility/index.html http://developer.android.com/tools/testing/testing_accessibility.html.

T. Vu, et al. ("Distinguishing Users with Capacitive Touch Communication", Proceedings of the 18th annual International Conference on Mobile Computing and Networking, ACM New York, N.Y., doi: 10.1145/2348543.2348569, pp. 197-208, 2012

H. W. Klein, "Noise Ammunity of Touchscreen Devices", Cypress Semiconductor Corp. Whitepaper, http://www.cypress.com/?docID=42410

Capacitive touchscreen devices are widely used in computing and communication. Unfortunately, they are not easily usable by a significant audience of elderly and motion-disabled users (individuals with disabilities that affect the control and stabilization of their arms and hands) who have difficulties operating such touchscreen devices. There are an estimated 34 million motion-disabled individuals in the US, many of whom can use an older mouse-based computer or button-based mobile phone but have trouble with newer touchscreen devices. The buttons in the older technology allows the motion-disabled user to choose an (x,y) position independently of invoking an action. A physical button is useful because 1) the motion-disabled user may need extra time to move to the intended position, and 2) the motion-disabled user hitting the physical button provides a separate information channel to invoke an action that the motion-disabled user can control. In an unadapted touchscreen device, motion-disabled users frequently invoke undesired actions because they lack the ability to make the required gesture that combines a two-dimensional position and an invocation into one fluid motion. A few inadvertent taps (mis-recognized by the operating system as a user invocation) can bring quite obscure screens that compound the problem.

One prior-art approach to solving this problem is a software-only approach that adapts the touchscreen device for motion disabled users. Unfortunately, there exists little such motion-disability software, other than those designed for the blind touch-speak-and-touch-again applications ("Accessibility added to Kindle Fire as blind group plans protest", http://www.mediaaccess.org.au/latest_news/general/accessibility-added-to-kindle-fire-as-blind-group-plans-protest.), or those that implement limited functionality (http://www.wireless.att.com/learn/articles-resources/disability-resources/mobile-speak-magnifier.jsp and http://www.parkinsons.org.uk/content/easycall-free-mobile-app-people-parkinsons). An alternative form of touchscreen input called "swabbing", which only relies on the average angular component of a motion-disabled user's motion, is believed to be useful for Parkinson's patients (C. Wacharamanotham, et al., "Evaluating swabbing: a touchscreen input method for elderly users with tremor", *SIGCHI Conference on Human Factors in Computing*(*CHI*11),pp. 623-626, 2011). However, swabbing is a more tedious, less direct way of interacting, and does not allow general-purpose access to full capabilities of the touchscreen.

A general software-only solution for the motion-disabled audience is very challenging. Despite the fact Google's Android operating system has an extensive internal framework to enable development of accessibility services (http://developer.android.com/guide/topics/ui/accessibility/index.html), they recommend the use of a hardware directional keypad (DPAD) consisting of up, down, left and right arrow buttons (http://developer.android.com/tools/testing/testing_accessibility.html). The DPAD was once an ubiquitous hardware feature on early-generation phones and tablets that is no longer commonly available as hardware manufacturers reduce cost by eliminating such physical buttons in favor of touch-only interfaces. Even a DPAD-equipped touchscreen poses problems for a motion-disabled user as the user may still inadvertently tap on the touchscreen. For this reason, in addition to accessibility software, motion-disabled users would benefit from a touchscreen accessory (which substitutes for the human finger) to help adapt the touchscreen device for motion-disabled users.

There are several prior-art touchscreen accessories designed to substitute for the human finger's role with touchscreen devices; however none of them are suitable to adapt touchscreen devices for motion-disabled users. For example, Wiemeersch, et al. (U.S. Application 20130268094) discloses a prosthetic accessory for users lacking digits with which to touch the touchscreen, but does not solve problem of inadvertent taps for those users with digits but who lack the neuromuscular control to form the required gestures and avoid inadvertent taps.

Many types of prior-art accessories are intended for non-disabled users. First, there are texting gloves and similar products, typified by Asiaghi (U.S. Pat. No. 8,528,117). Ordinary gloves insulate the connection between the user and the touchscreen, and thereby prevent the user from activating the touchscreen at all. Texting gloves are similar to ordinary gloves, except they have holes or conductive material at the fingertips, allowing the user to make an electrical connection to the touchscreen. Texting dots (http://www.amazon.com/Texting-Dots/dp/B0032GCP0C/) are adhesive conductors that attach to the finger to give the user more precise electrical contact. Other products allow users to convert ordinary gloves into texting gloves include a conducting resin (http://www.amazon.com/AnyGlove-TM-Synthetic-Touchscreen-Compatible/dp/B00AB3EVOW/) that users apply to ordinary gloves and a self-adhesive thin capacitor that attaches to the exterior of ordinary gloves (http://www.amazon.com/Capacitive-Sticker-Screen-iPhone-Smartphone/dp/B00A1VGQS8/).

Second, there are styli, which are typically conductive cases with tips that prevent damage to the surface of the touchscreen, typified by Badeye, et al. (U.S. Pat. No. 8,125, 469) and Elias (U.S. Application 20130234986). Other form-factors, such as puppets or thimbles are known in the prior art, such as Green, et al. (U.S. Pat. No. 8,803,844), Everest, et al. (US 20120242618), Siuta (US 20130127791), Wu, et al. (U.S. Application 20110285671), Yy-Cho Yee (U.S. Application 20090211821) and Mallard, et al. (U.S. Application 20050231471). Such styli, gloves, etc. are similar in that they do not have any internal active electronic circuitry, only an electrical connection between the touchscreen and the user (making them quite inexpensive). For this reason, they do not eliminate problems caused by hand tremors and other problems experienced by motion-disabled users. Some styli have more sophisticated electromagnetic-, antenna-, and/or resonate-circuit components, as typified by Cho, et al. (U.S. Pat. No. 8,947,405), Sato, et al. (U.S. Pat. No. 8,094,133), Wu, et al. US 20100053113), Ih, et al. (U.S. Application 20140104224), Chang, et al. (U.S. Application 20100053120), Yi-Ching Liu, et al. (U.S. Application 20090167727), Chang An-Yu (U.S. Application 20100053120) and Bespertov (EP Application 2662754A1) that offer non-disabled users increased precision or convenience but that are not helpful to motion-disabled users.

Third, an authentication signet ring for touchscreen devices has been demonstrated by T. Vu, et al. ("Distinguishing Users with Capacitive Touch Communication", Proceedings of the 18th annual International Conference on Mobile Computing and Networking, ACM New York, N.Y., doi: 10.1145/2348543.2348569, pp. 197-208, 2012 and U.S. Application 20130257804) which capacitively injects a multi-hundred Hz signal having a relatively high voltage (10 to 20V) into the touchscreen circuit, which the circuit occasionally interprets as a sporadic phantom movement or touch event. Vu et al. propose training software in the touchscreen device to recognize the meaning of such sporadic phantom events and say practical usability (>85% reliability) of their idea may require modification of the proprietary firmware of the row-scanning touchscreen-interface circuit—a proposition that may be difficult to arrange. Due to its asynchronous nature, the phantom signal will cause phantom y coordinates to be received, which make Vu et al. problematic for an accessory whose purpose is to help the motion-disabled communicate substantially-accurate (x,y) information simultaneously with low-bandwidth information about invocation intention. Also, Vu et al. require a power supply with a much higher voltage than typical battery-powered accessories. Similar high-voltage techniques using metal "slugs" are used for testing touchscreen devices during manufacture (H. W Klein, "Noise Ammunity of Touchscreen Devices", Cypress Semiconductor Corp. Whitepaper, http://www.cypress.com/? docID=42410) which share the same disadvantages in the context of motion-disabled users as Vu et al. Also, similar circuits disclosed by I-Hau Yew, et al. (U.S. Pat. No. 8,564,553) and Ure (U. S. Application 20110234623) use high voltages and are unsuitable for an accessory to assist motion-disabled users avoid inadvertent taps.

Active styli, as typified by Mann (U.S. Pat. No. 9,110, 523) and Vuppu et al. (U.S. Pat. No. 8,766,954) are intended to allow the non-disabled to interact on a conventional capacitive touchscreen with a finer tip than conventional blunt-tip styli, for example to draw or take handwritten notes. Despite the fact that the tip of the active stylus is smaller than would allow enough capacitive coupling to ever be sensed by the otherwise conventional touchscreen, the active stylus accomplishes normal touchscreen operation through the use of a circuit that senses the change in charge at the tiny tip resulting from actions of the scanning circuitry of the touchscreen and produces an amplified signal that drives a voltage on the case of the stylus (and the user holding it), in essence creating a high-voltage injection of the type suggested earlier, but only at the precisely timed moment when the touchscreen scanning circuitry will register the proper (x,y) coordinates where the tip is located. Like all the preceding simple accessories, an active stylus by itself does not aid a motion-disabled individual. These accessories were designed for non-disabled individuals.

In contrast to such simple accessories, there are drawing pens (http://web.archive.org/web/20121025064503/http://aiptek.eu/index.php/en/products/graphics-tablets-a-digital-pens/digital-pens/mynote-pen and http://web.archive.org/web/20131018005240/http://www.n-trig.com/Data/Uploads/Misc/DuoSense%20Digitizer_February%202012.pdf) which have on-pen electronics, including a wireless interface to a hardware receiver that plugs into the touchscreen. Because the pen is synchronized to the high-frequency updating of the screen, it can identify position accurately to the pixel (or sub-pixel) level, typically better than the capacitive touchscreen technology (which is actually disabled during the use of the pen). Such pens are an order of magnitude more expensive than gloves or styli, and are used only for special drawing applications.

Some prior-art styli for non-disabled users have circuitry to communicate extra data (such as stylus orientation, button activation, pressure and/or temperature sensing), including Tran et al., (U.S. Pat. No. 8,648,837), Hanizl, et al. (U.S. Application 20090256824) and Harley (WO Application 2012177573A2), however these assume they are used as an adjunct to finger invocation to communicate such extra data from the accessory operated by a non-disabled user (who is capable of avoiding inadvertent finger interference). They do not disclose how a touchscreen device could filter out inadvertent tap events caused by a motion-disabled user holding such an accessory who unintentionally touches the touchscreen nor do they disclose how to separate non-destructive communication of substantially-accurate (x,y) from the invocation of an action.

Prior-art glove-based interaction devices with active electronics bear some superficial similarity to such accessories, for example: conductive-fingertip gloves (D. A. Bowman, "Novel uses of Pinch Gloves™ for virtual environment interaction techniques," *Virtual Reality*, vol. 6, no. 3, pp. 122-129, 2002 and http://www.fakespacelabs.com/tools.html), "whole-gloves" with >2 conductors (www.virtex.com), accelerometer gloves (J. Perng, et al., "Acceleration sensing glove (ASG)", *The Third International Symposium on Wearable Computers (ISWC'99)*, pp. 178-180, 1999), tactile gloves (J. S. Zelek, et al., "A haptic glove as a tactile-vision sensory substitution for wayfinding". *Journal of Visual Impairment and Blindness*, Vol. 97, No. 10, pp. 621-632, 2003), muscle-tension gloves with inconvenient conductive gel (J. Webster, J. *Medical Instrumentation:Application and Design*. John Wiley & Sons, Inc., 1998) and skin-conductivity gloves (R. W. Picard and J. Scheirer, "The galvactivator: A glove that senses and communicates skin conductivity", *Proceedings 9th Int. Conf. on HCI*, August 2001). These glove-based interaction devices do not solve motion-disabled interaction issues with touchscreen devices, and may involve more costly hardware.

Advantages of the Present Invention

The present invention introduces a physical button as part of an inexpensive hardware accessory that substitutes for the human finger to reduce the chance of inadvertent invocation. In the preferred embodiment, an extra-software-layer running on the touchscreen provides visual feedback in a general-purpose way, allowing full access to the capabilities of the touchscreen. The extra-software layer intervenes between the novel accessory device and the unadapted behavior of the touchscreen device without getting in the way of that unadapted behavior. The novel touchscreen accessory has one or more buttons or similar transducer(s). From the user's standpoint, this performs at least two separate functions: 1) allow the user to point to a substantially-accurate two-dimensional (x,y) location on the touchscreen non-destructively (meaning to leave unaltered the internal state of the underlying application) and 2) invoke an action associated with that (x,y) coordinate. Motion-disabled users may need to repeatedly adjust the position (x,y) they wish to touch on the screen to achieve the desired goal. The extra-software-layer on the touchscreen makes this (x,y) coordinate visible to the user in the form of five translucent rectangles, but conceals this information from the underlying application until the user pushes a button on the accessory to invoke an action associated with that coordinate. At that stage, the extra-software layer changes to allow a dispatched touch event in a region near (x,y) to be communicated to the underlying application, causing the desired change to the application state. After feedback from the application (or a short period elapses), the extra-software layer reverts to non-destructive mode, allowing the motion-disabled user to continue to interact with the full capabilities of the touchscreen device without interference from inadvertent touch events. An advantage of five-rectangle filtering is that it may be implemented without needing modification of the operating-system kernel or cooperation from operating-system or device vendors.

DRAWINGS—FIGURES

Figure 4:
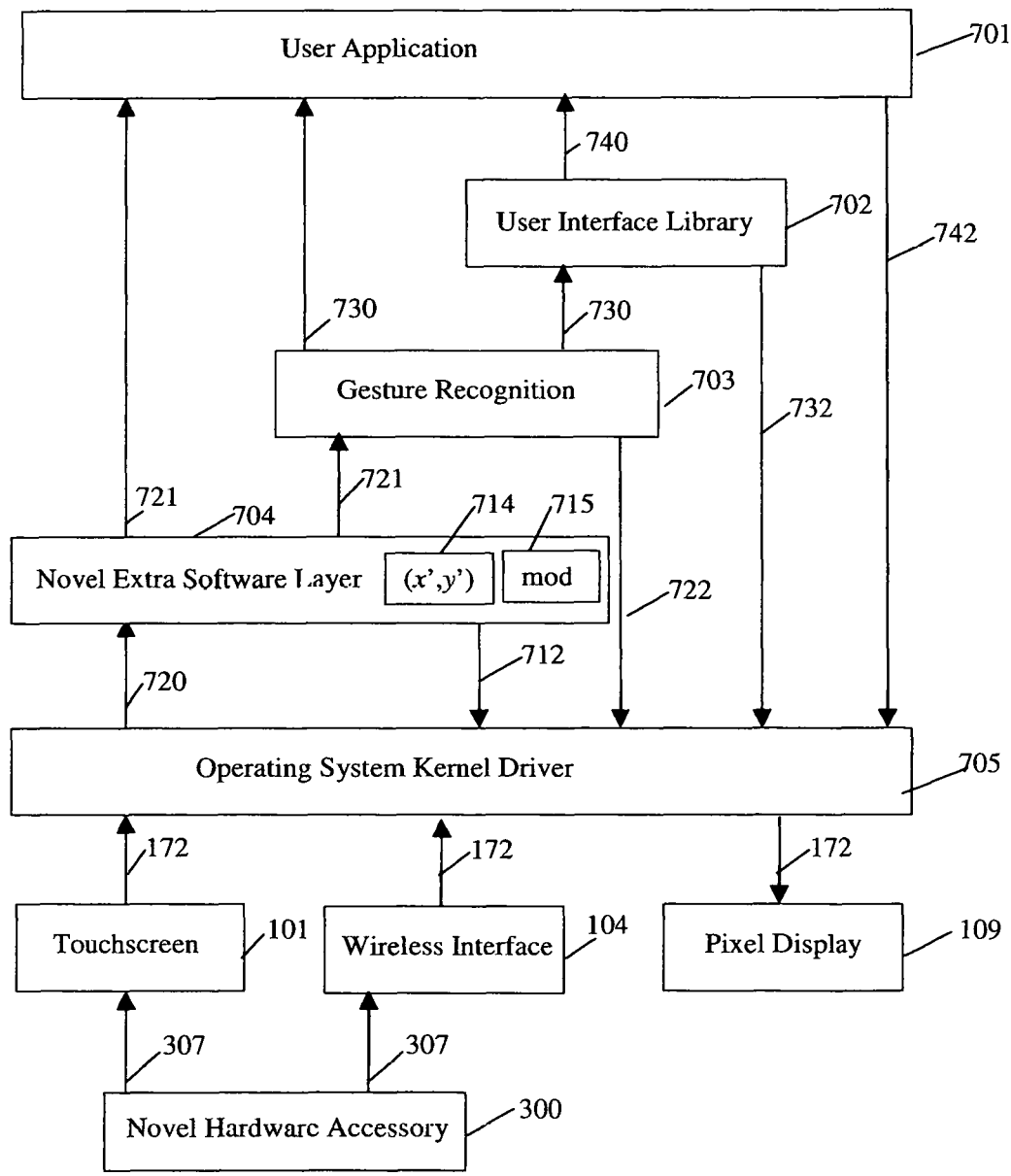

FIG. 4 shows how, without disturbing the higher layers of software, the novel extra-software layer running in the touchscreen device: intercepts messages created by the novel accessory, maintains an internal (x', y') coordinate and a current mode, displays this coordinate on the pixel display, and uses this coordinate to send messages to higher layers when the user activates a novel hardware accessory.

Figure 5:
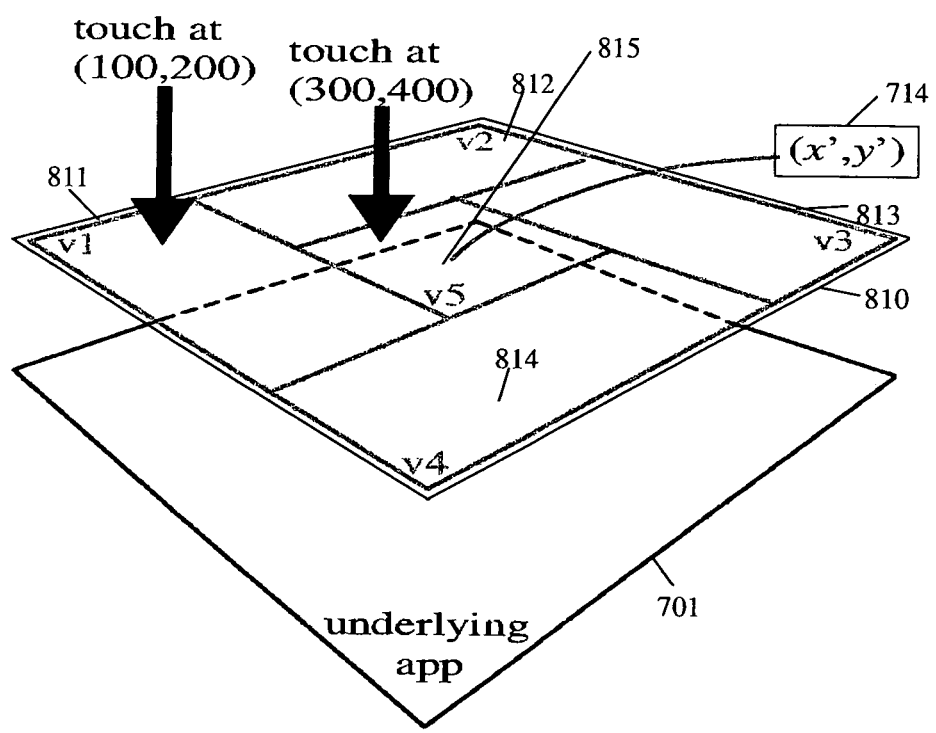

FIG. 5 shows five translucent rectangles, positioned relative to (x',y'), implemented as one or more view(s), which prevent touch events from reaching an underlying user application that is visible to the user when the extra software layer is in a non-destructive mode.

Figure 6:
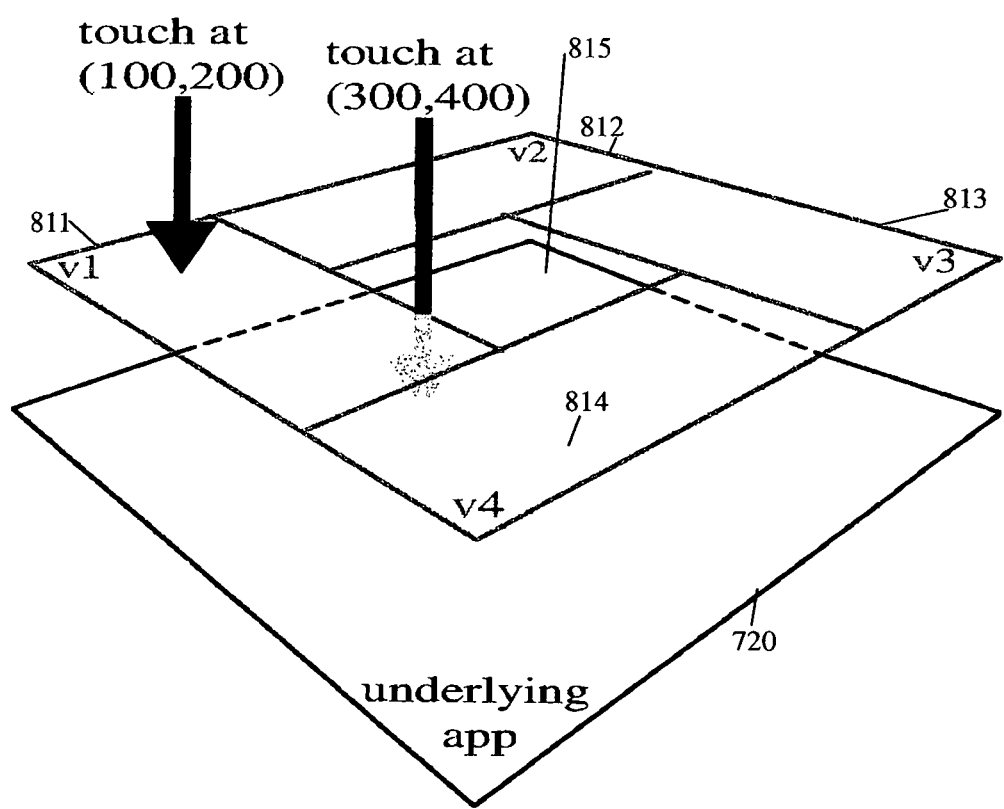

FIG. 6 shows four translucent rectangles, positioned the same as FIG. 5, each implemented as a separate view, which prevent touch events that are not near (x',y') from reaching the underlying user application, but which allow touch events near (x',y') to reach the underlying user application when the extra software layer is in a destructive mode.

Figure 7:
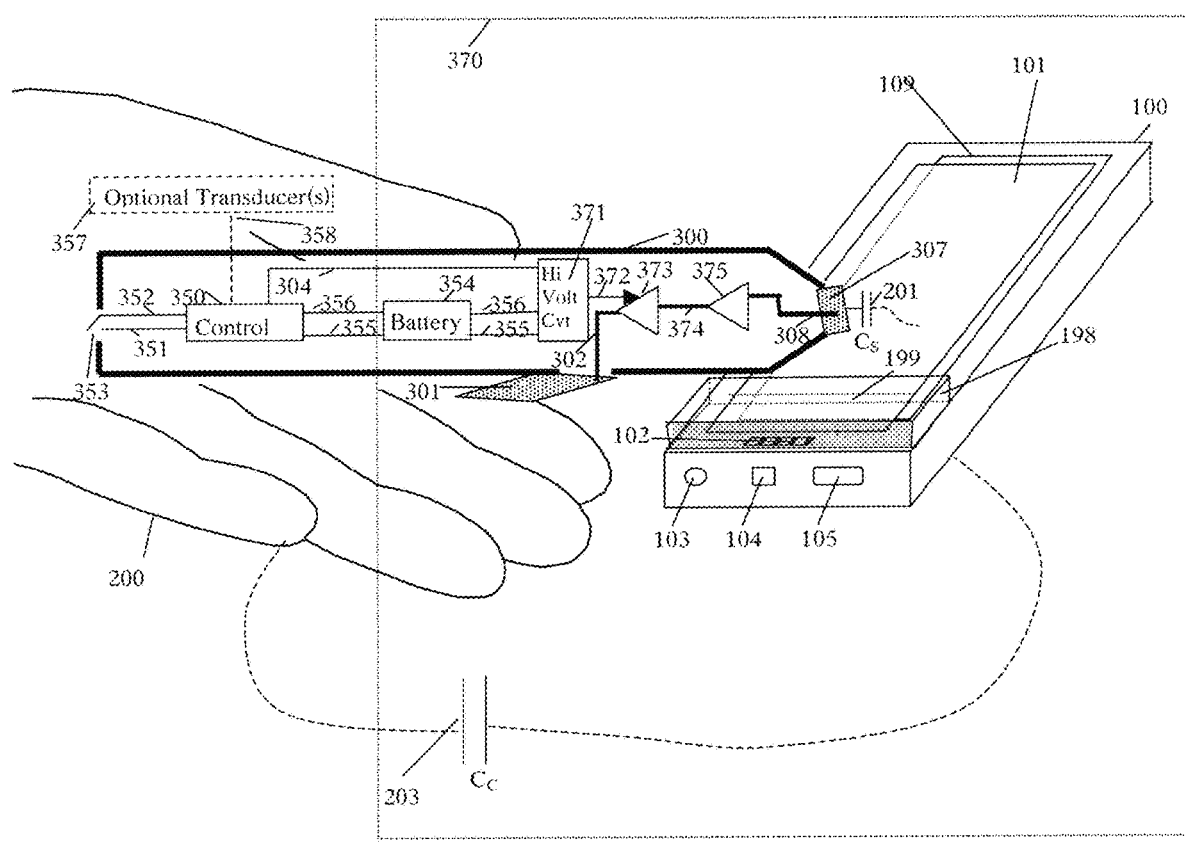

FIG. 7 shows a possible implementation of accessory 300 as an active stylus.

Figure 8:
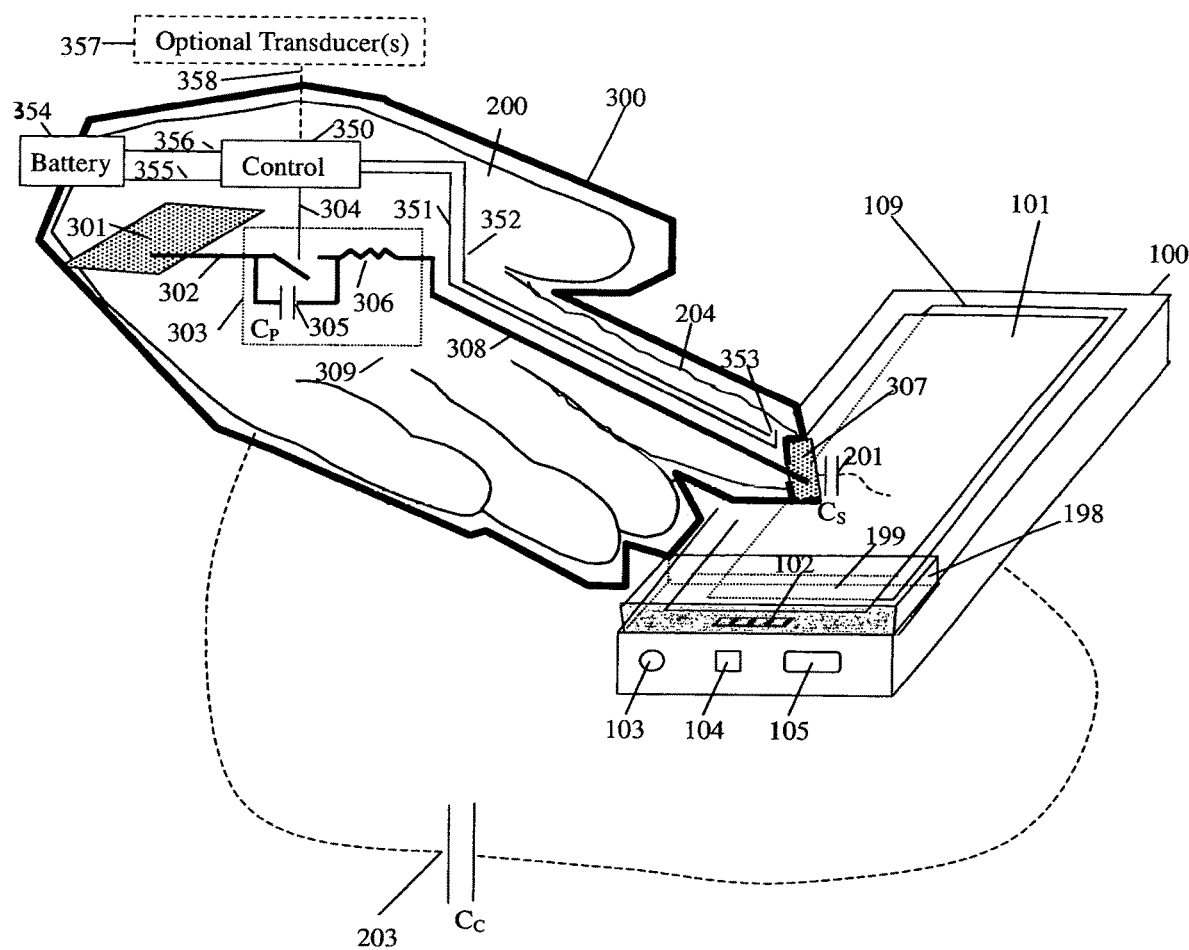

FIG. 8 shows a possible implementation of accessory 300 as a glove which fits around the user's hand 200 similar to the one disclosed in patent application Ser. No. 14/708,572.

Figure 9:
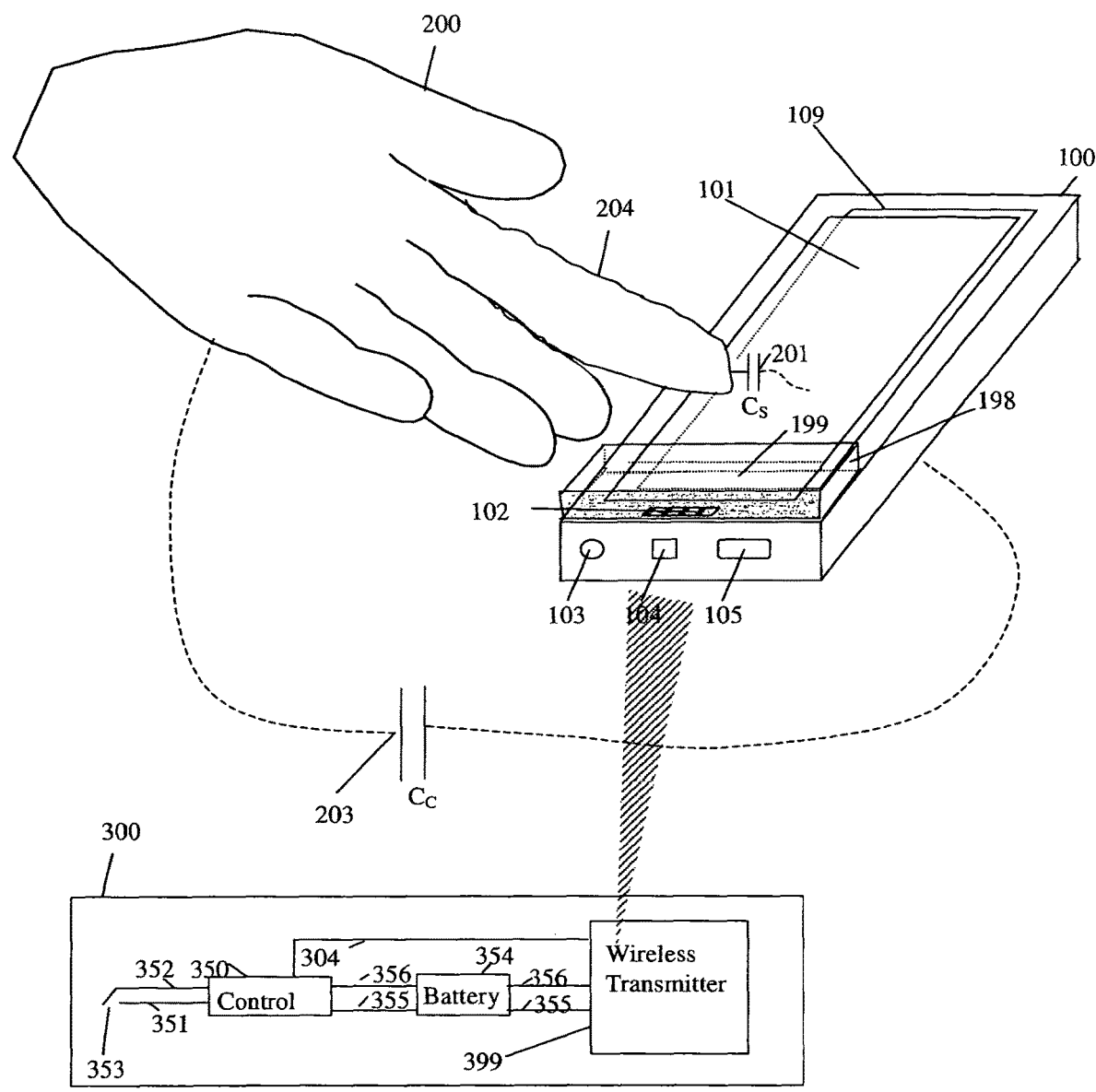

FIG. 9 shows a possible implementation of accessory 300 as a wireless peripheral.

Figure 10:
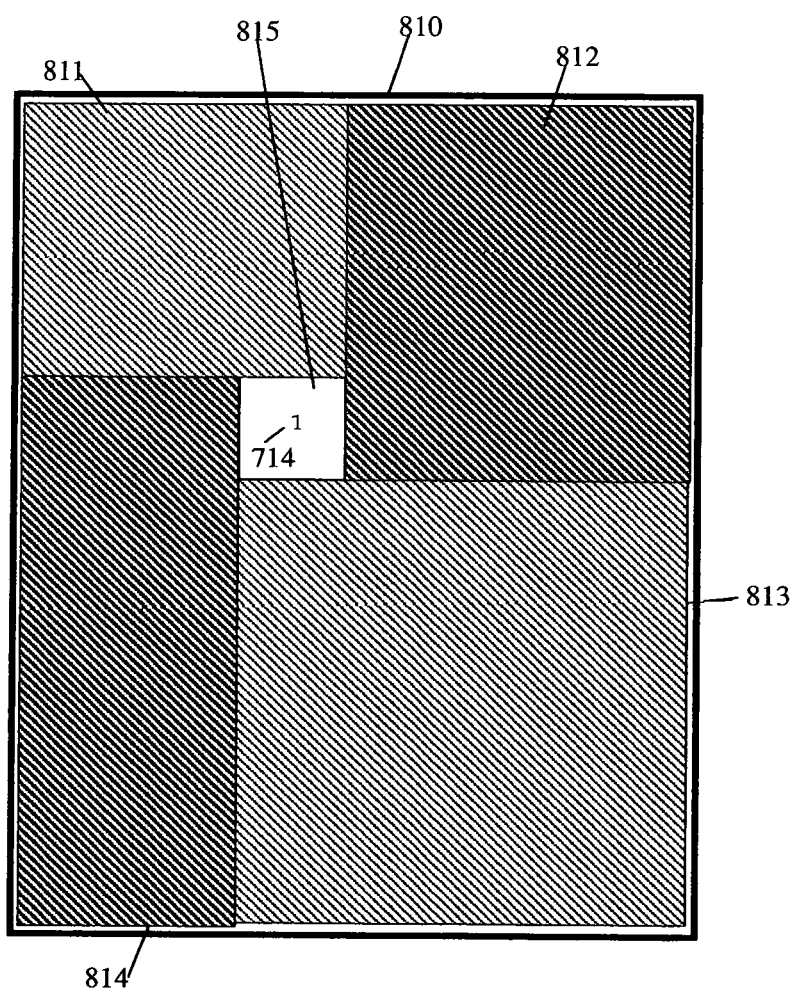

FIG. 10. shows the typical appearance of the view 810 created by the extra-software layer when mode 715 is a particular mode ('1') represented in FIG. 10 as diagonal cross-hatching in rectangles 811-814, leaving center rectangle 815 clear.

Figure 11:
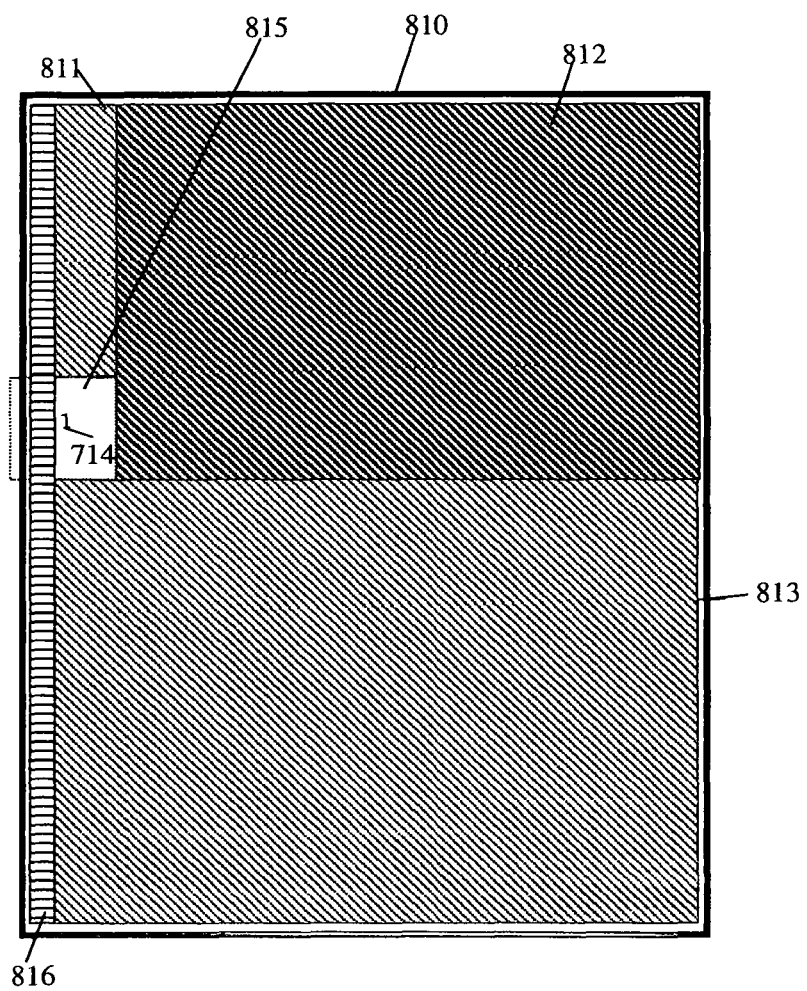

FIG. 11. shows the appearance of view 810 created by the extra-software layer when the user has swabbed the center rectangle 815 to be near the left edge. Rectangles 811-813 remain the same (horizontal cross-hatching) reflecting that the mode 715 has not changed, but a vertical bar 816 is created by the extra-software layer indicating to the user that continued swabbing to the left will change to mode 715.

Figure 12:
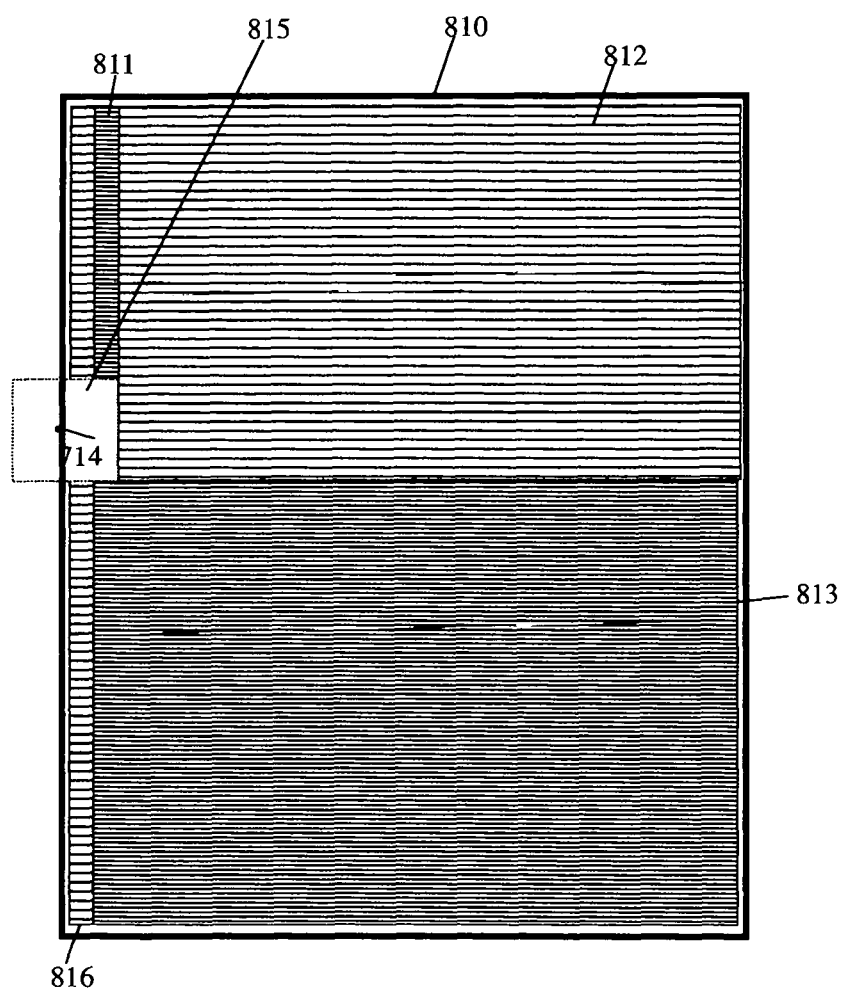

FIG. 12 shows the appearance of view 810 after the user has swabbed the center of rectangle 815 beyond the edge of view 810. The appearance of rectangles 811-813 changes to reflect the fact the extra-software layer has changed mode 715 to corresponding to the horizontal cross-hatching and also displayed as the digit '2' near the (x',y') location 714.

Figure 13:
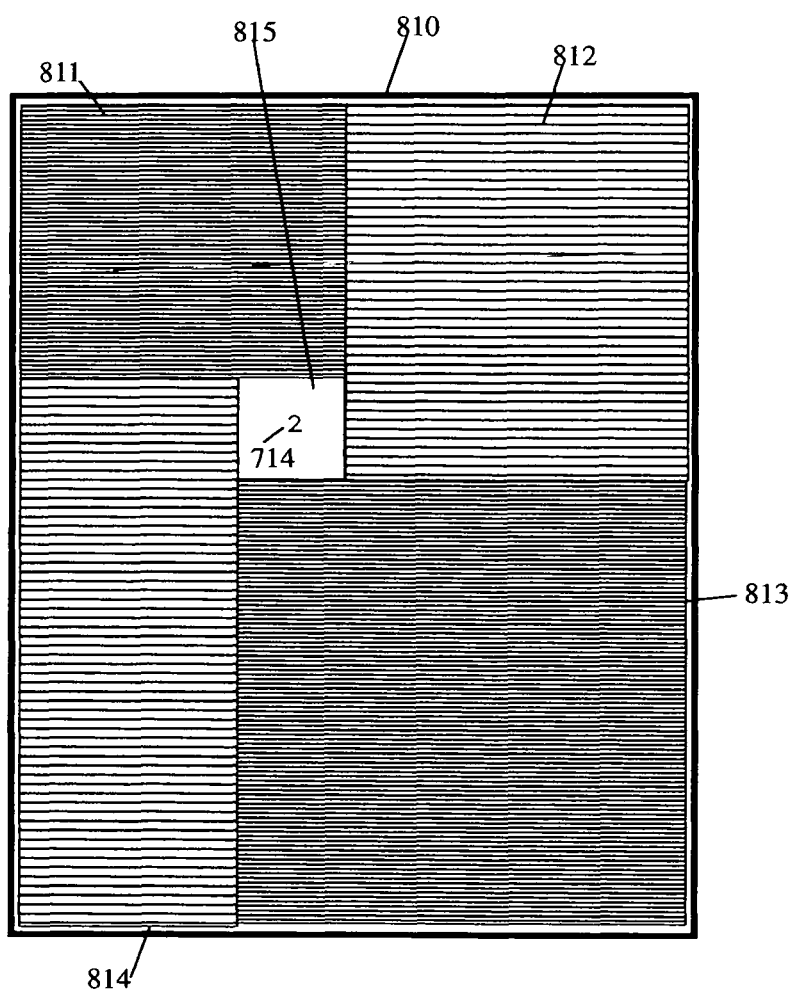

FIG. 13. shows the appearance of view 810 created by the extra-software layer when the user has swabbed the center rectangle 815 back. The rectangles 811-814 remain as horizontal cross-hatching reflecting the new mode 715 displayed as the digit '2' near the (x',y') location 714.

Figure 14:
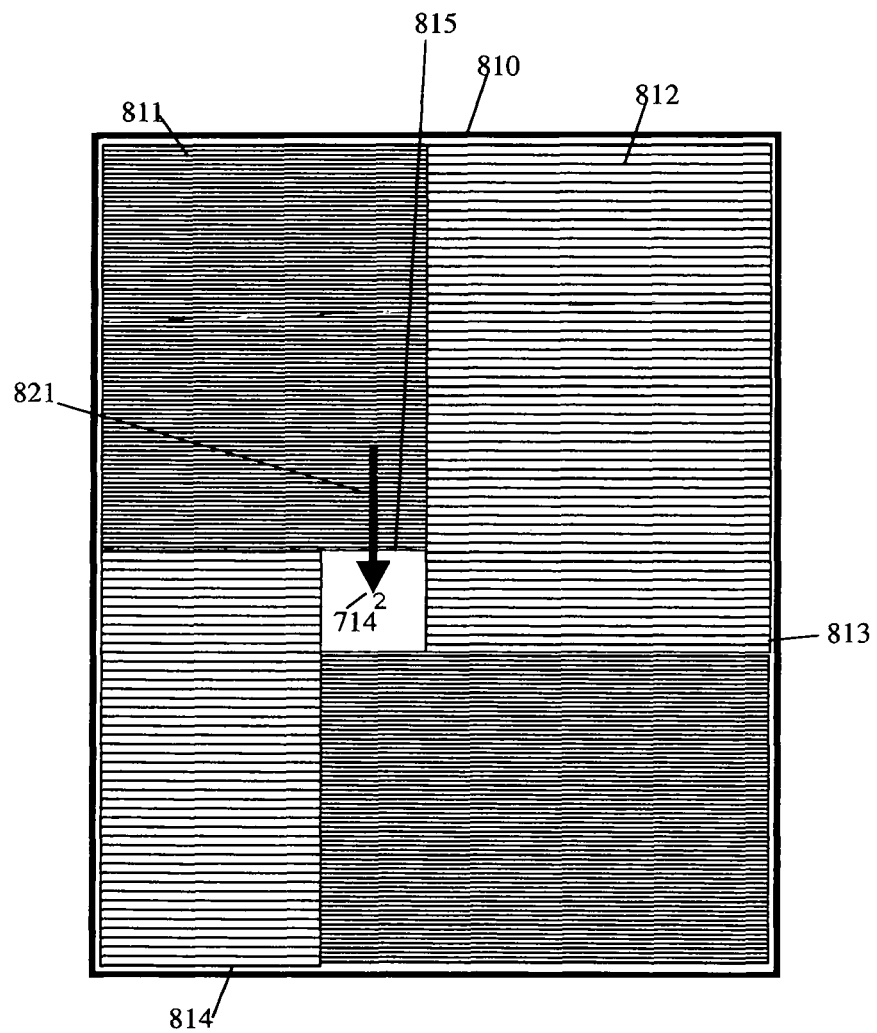

FIG. 14. shows the appearance of view 810 created by the extra-software layer after the user has pushed the accessory button 353 once and then swabbed the center rectangle 815 down. The rectangles 811-814 remain as horizontal cross-hatching reflecting the same mode 715 as displayed previously (the digit '2' near the (x',y') location 714). A visible arrow 821 has been drawn on the screen between the location where the user pushed button 353 (swipeX,swipeY) and the arrowhead at the current (x',y').

Figure 15:
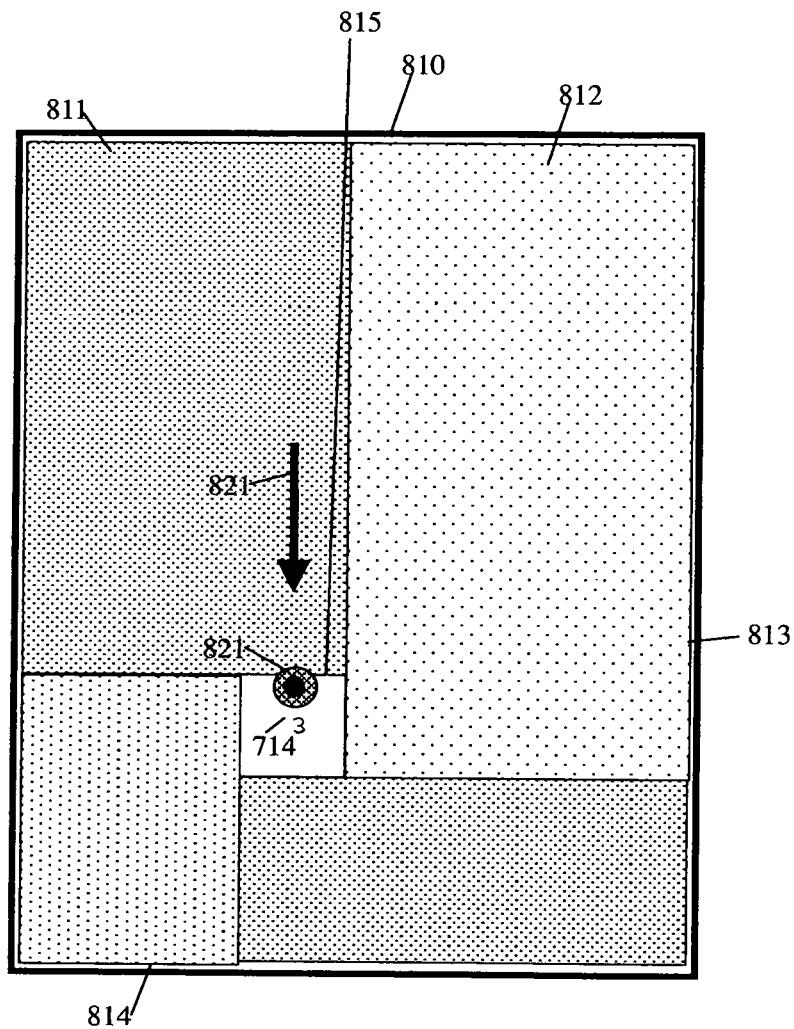

FIG. 15. shows the appearance of view 810 that would be displayed if FIGS. 13-14 had occurred in mode '3', the user had pushed the accessory button 353 twice and then had swabbed the center rectangle 815 even further down. The rectangles 811-814 are shown as dots reflecting the mode 715 displayed as the digit '3' near the (x',y') location 714. The visible arrow 821 was previously created between the location where the user pushed the button 353 first (swipeX, swipeY) and the arrowhead where the user pushed the button 353 second (zoomX,zoomY). Near the current (x',y') is the pivot 821.

DETAILED DESCRIPTION

Figure 1:
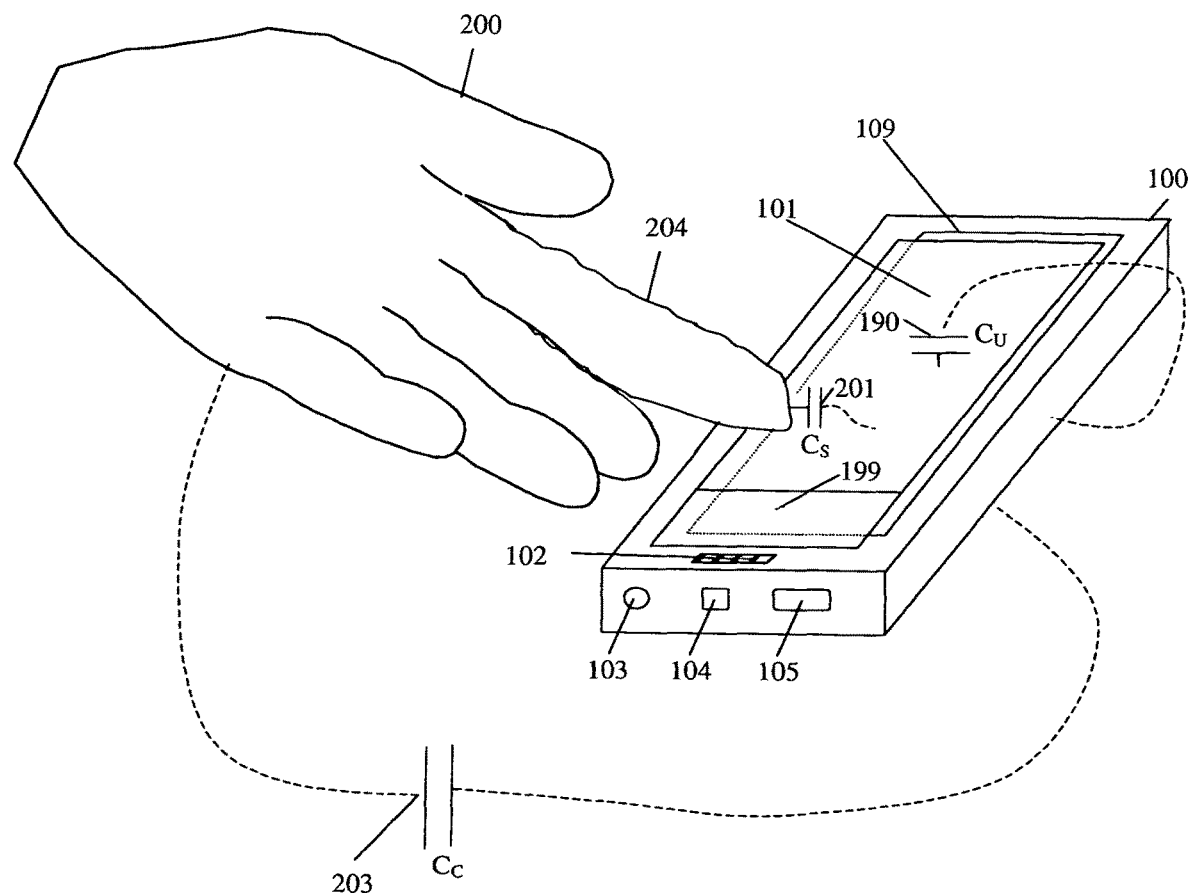
FIG. 1 shows the context in which the unaided human hand interacts capacitively with a prior-art touchscreen device.

Referring to FIG. 1, the prior-art capacitive touchscreen device 100 includes a touchscreen 101. The touchscreen 101 senses the change in capacitance that results when it is touched by a user's finger 204. Underneath the translucent material of touchscreen 101 is a pixel display 109, allowing an easy-to-understand user interface, in which the user touches the portion of touchscreen 101 at coordinate (x,y) co-located with the portion of an image displayed on pixel display 109. The (x,y) sensed by touchscreen 101 identifies an object displayed on touchscreen 109 of interest to the user. Typically, a prior-art touchscreen device 100 also includes several additional input-output interfaces, such as microphone 102, audio jack 103, wireless transceiver 104 and USB port 105. Patent application Ser. No. 14/708,572 envisions the proposed extra-software layer could operate without using such additional input-output interfaces by receiving signals encoded via touchscreen 101. The five-rectangle filtering approach disclosed below is compatible with both the touchscreen-signaling approach of patent application Ser. No. 14/708,572 as well as prior-art accessories described earlier that use additional input-output interfaces such as microphone 102, audio jack 103, wireless transceiver 104 and USB port 105.

The majority of the area of touchscreen 101 and the corresponding area of pixel display 109 are available to be configured arbitrarily by user applications, which are software programs created by third parties (other than the manufacturer) that the user may choose to download onto the device. Often, the operating-system reserves a small menu region 199 of touchscreen 101 that is unavailable to user applications. Touching portions of menu region 199 invoke operating-system functions, such are returning to an operating-system home screen or back to a previous screen.

Figure 2:
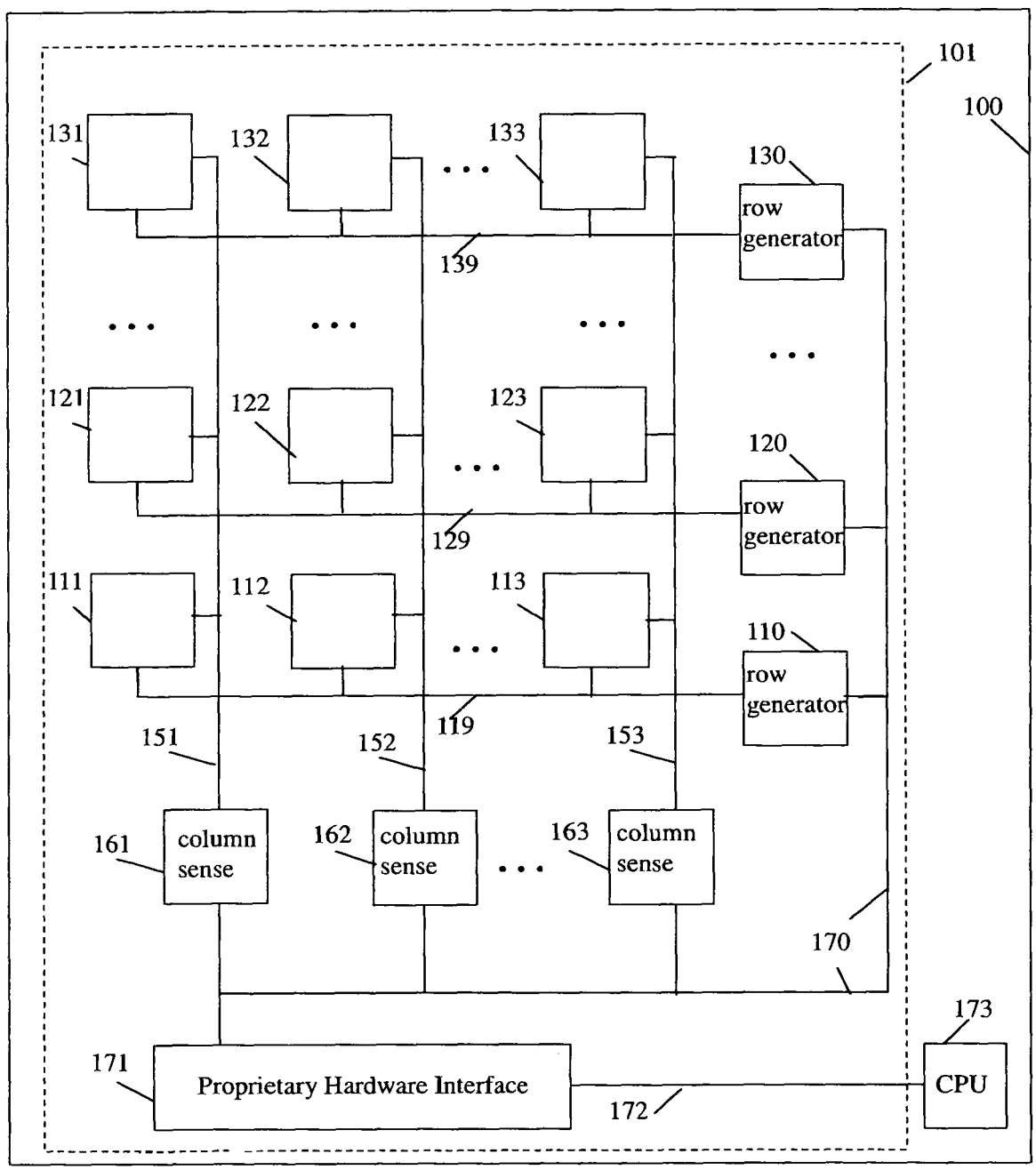
FIG. 2 shows a simplified view of the rectangular array of translucent capacitive plates and associated electronics composing a prior-art touchscreen together with the CPU that enables software to run on the touchscreen device.

The touchscreen 101 recognizes when it is touched by the user's hand 200 (usually by a single finger 204) because of the electrical circuit formed between the case of touchscreen device 100 through the finger-to-case capacitance 203 (typically with air as the dielectric and observed as $C_C$ picofarads), continuing through the finger-to-screen capacitance 201 (typically with glass or other similar material as the dielectric and observed as $C_S$ picofarads). Most regions of the touchscreen 101 are not connected through the user's hand in this fashion, and instead are connected through a simpler circuit formed between the case of touchscreen device 100 through the unconnected capacitance 190 (with air and glass as dielectrics observed as $C_U$ picofarads). Referring to FIGS. 1 and 2, the touchscreen 101 consists of a large two-dimensional array of individual capacitor plates (of which plates 111, 112, 113, 121, 122, 123, 131, 132 and 133 are shown with ellipses in between to indicate many similar plates) embedded within the translucent dielectric material on the surface of touchscreen 101. The plates are connected to a plurality of voltage generators (of which generators 110, 120 and 130 are shown with ellipses to indicate many similar generators) corresponding to each row of the array via a plurality of row wires (of which wires 119, 129 and 139 are shown with ellipses to indicate many similar wires). The generators create a voltage spike relative to the case ground 100. The plates are also connected along the columns to a plurality of sensors (of which voltage sensors 161, 162 and 163 are shown with ellipses to indicate many similar sensors) via a plurality of column wires (of which wires 151, 152 and 153 are shown with ellipses to indicate many similar wires). The voltage generators 110, 120, 130, . . . and sensors 161, 162, 163, . . . cooperate to measure the capacitances of plates 111, 112, 113, 121, 122, 123, 131, 132, 133, . . . in a time-multiplexed (row-by-row) fashion under the control of proprietary-hardware interface 171. Conceptually, this control is communicated via internal bus 170, although those skilled in the art can envision many alternative control arrangements. For example, the arrangement in FIG. 2 is capable of multi-touch, that is recognizing when more than one finger touches the screen. Those skilled in the art can envision a simpler arrangement only capable of recognizing one finger that time multiplexes rows and columns. The intelligence and functionality of the touchscreen device 100 (for instance, as a phone or a tablet computer) is implemented largely by a CPU 173, which connects to the proprietary hardware interface 171 (and therefore all the elements that function as touchscreen 101) via the CPU bus 172. Those skilled in the art will realize there are a wide variety of CPU bus architectures used in the prior art, and that the simple abstract connections shown in FIG. 2 are intended to represent any of these.

Figure 3:
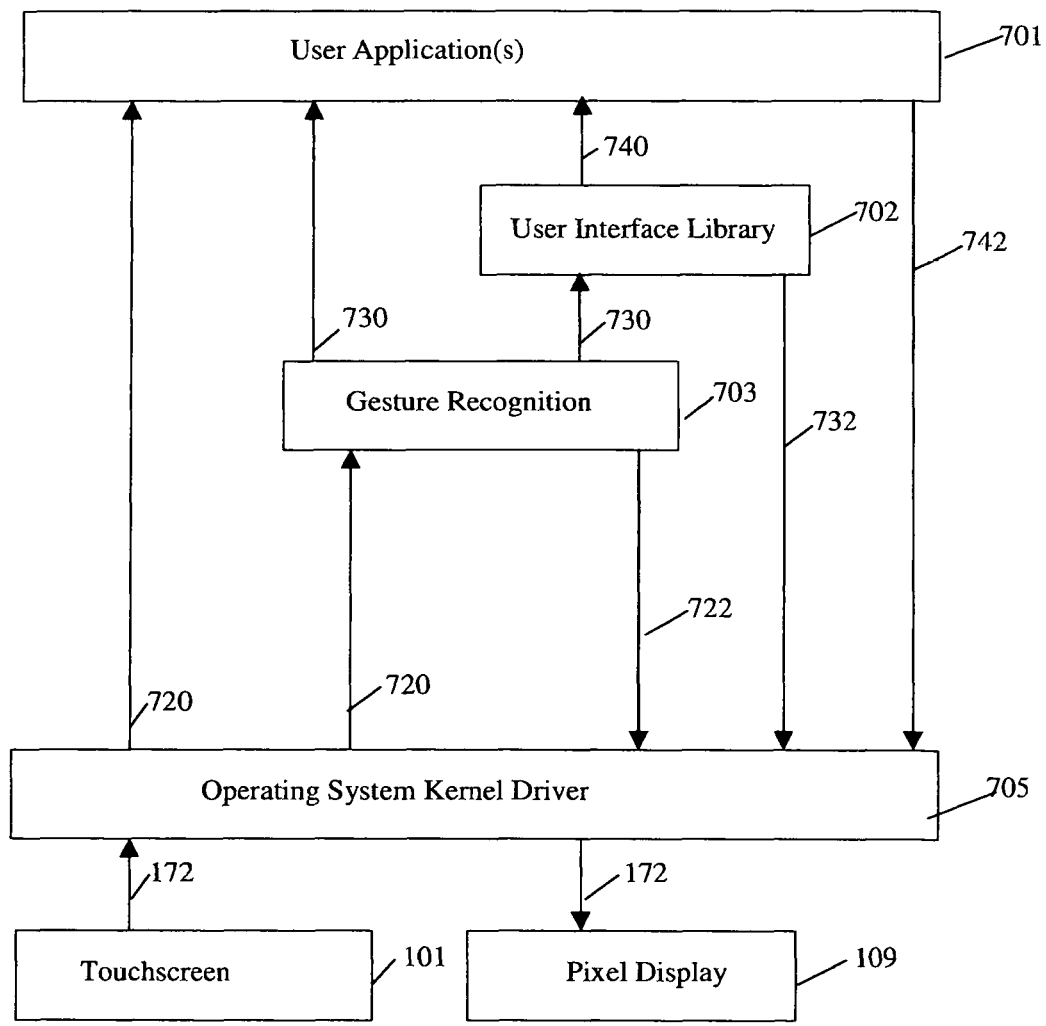
FIG. 3 shows conceptually the layers of software running in a prior-art touchscreen device relevant to the present invention, including operating system kernel driver, gesture recognition, user interface and user application(s).

The CPU 172 runs several levels of software for the touchscreen device 100. Referring to FIGS. 1, 2 and 3, the lowest level of software 705 (operating system, kernel and drivers) convert the large number of capacitance measurements provided by touchscreen 101 via bus 172 into a more compact and usable form for the upper levels of software, such as gesture recognition 703, user interface 702 and user application(s) 701. This operating system kernel driver level 705 and CPU bus 172 are also responsible to interface to all other devices, such as pixel display 109 that is activated by downward-flowing messages 722, 732 and 742. The software layer of the prior-art touchscreen device 100 of primary interest here is the operating system device driver software 705, which, among other things, compares the two-dimensional array of capacitance values measured by proprietary hardware interface 171 at an earlier time period (say ⅙₀ of a second ago) against the two-dimensional array of capacitance values measured more recently. In regions of the arrays where the corresponding old and new capacitance values differ significantly, the operating system device driver software 705 categorize these regions as events to be communicated to higher levels of software. Many kinds of events may be included in a particular design; typically the most important of these are UP, DOWN and MOVE events associated with a particular (x,y) coordinate at a particular time, t. Messages 720 allow the operating system to communicate such events to higher levels of software. Instead of receiving thousands of capacitance values every ⅙₀ of a second, the upper levels of software only receive event information when there are changes caused by external influence, such as the motion of the finger 204. Typically, the operating system has features like gesture recognition 703 that convert a sequence of UP, DOWN and MOVE events that follow prescribed patterns into gestures, like tapping, zooming and scrolling. The prescribed patterns must follow the time-varying parametric expectations of the operating system; in other words, the user is required to move according to a time-sensitive pattern in order for the gesture to be recognized by the operating system correctly. These gestures are communicated upwards via messages 730. It is primarily at this level of software where motion-disabled users have difficulties. Artifacts like hand tremor can cause sequences of unintended events, which gesture recognition 703 may misclassify. The operating system typically provides additional layers of software, such as user interface libraries 702 that modify the meaning of gesture messages 730 in context of different user interface elements, like check boxes and virtual buttons. Such context-sensitive user-interface information is communicated to the user application 701 via messages 740. For example, tapping on a checkbox changes whether it is checked or not, whereas tapping on a virtual button invokes the action associated with that button. For a motion-disabled user, inadvertent tapping when the (x,y) coordinate happens to be on a virtual button may cause inadvertent invocation of software that is hard or even impossible to undo. The goal of the present invention is to reduce the chance that a motion-disabled user experiences such difficulties. Those skilled in the art will recognize the layers of software in an actual operating system may differ from those outlined here, and this simple discussion is only to illustrate the general context of touchscreen software in which the present invention operates.

Referring to FIG. 4, the present invention is an adapted touchscreen system for motion-disabled users which consists of a hardware accessory 300 that interacts with a novel extra-software layer 704. The accessory 300 transmits signals either: a) via connection 307 to touchscreen 101, which in turn sends them to operating system kernel driver 705 via bus 172; or b) transmits signals via connection 307 to wireless transceiver 104, which in turn sends them to operating system kernel driver 705 via bus 172. Those skilled in the art will recognize other input-output devices could communicate with accessory 300. The extra-software layer 704 intercepts messages 720 coming from the operating system kernel driver 705 and recognizes the signals encoded by the hardware accessory 300. The extra-software layer 704 includes (x',y') coordinate memory 714 for storing the intended position on touchscreen 101 that the motion-disabled user intends to manipulate. The extra-software layer 704 sends messages 712 to the operating system kernel driver 705, which in turn sends a visual indicator of (x',y') from coordinate memory 714 to pixel display 109 via bus 172, thereby giving the user visual feedback in the form of five adjacent translucent rectangles whose positions are calculated from (x',y'). At this stage, because the five rectangles fill the pixel display 109, the extra-software layer effectively prohibits substantially most touch events being passed to higher software levels (gesture recognition 703, user interface 702 or user application(s) 701). An exception may be that the operating-system menu region 199 may be required to be left exposed because operating-system manufacturers may have concerns about the security of third-party applications. When the user is satisfied with (x',y'), the user causes accessory 300 to transmit a special signal, which in turn cause the extra-software layer 704 to change a destructive mode and to allow only touch events originating inside the central rectangle near (x',y') to be passed upwards to higher software layers. Inadvertent touch events outside this area near (x',y') are filtered out. The extra-software layer 704 also includes a memory for mode 715 that describes the kind of gesture the user intends for the extra-software layer to dispatch to higher layers of software through this central rectangle. The extra-software layer 704 of the present invention autonomously dispatches a gesture near (x',y') through this central-rectangle hole creating message 721, which can then be processed by higher levels 703, 702 and/or 701, after which the extra-software layer returns to non-destructive mode. This allows the motion-disabled user to utilize the higher layers of the software more successfully than in an unadapted touchscreen system.

FIGS. 4, 5 and 6 show one possible approach to accomplish this five-rectangle filtering. FIG. 5 shows one (non-destructive) extra-software-layer mode: choosing (x',y'). FIG. 6 shows a different (destructive) extra-software-layer mode: invoking an action near (x',y') that is momentarily displayed on touchscreen 101 only during the time extra software layer 704 dispatches a gesture near (x',y'). In FIG. 5, there are five rectangles 811-815 that are translucent but that together entirely cover an underlying application. (For example, each could be separate Android "views" capable of capturing and discarding its own touch events, or all five could be drawn on a single Android "view" that captures and discards all touch events.) Portions of the edges of outer rectangle 811 (also labeled v1), outer rectangle 812 (also labeled v2), outer rectangle 813 (also labeled v3) and outer rectangle 814 (also labeled v4) together form the complete outline of inner rectangle 815 (also labeled v5). The Android operating systems allows the extra-software layer 704 to create such views that capture touch events when it requests <uses-permission android:name= "android.permission.SYSTEM_ALERT_WINDOW"/>, which is explained to the user (who must approve this due to security concerns) as "Draw over other apps". When the extra-software layer 704 is in this mode as shown in FIG. 5, touch events (either from accessory 300 or the user's finger 204) will not invoke any feature of the underlying user application 701, but instead will modify (x',y') in a dampened way analogous to swabbing (taking into account the difficulties of the motion-disabled user). As a consequence of modifying (x',y'), the sizes of rectangles 811-814 will change, and the center of rectangle 815 will move according to the user's wish. Inadvertent touches will be harmless (perhaps jiggling the rectangles 811-815 in a correctable way). Such inadvertent touches are prevented from reaching the underlying user application 701, for example at both (100,200) and (300,400). The sizes and positions of rectangles 811-815 are derived from (x',y'): the outer rectangles 811-814 have one corner at the outside of the physical screen; the inner rectangle 815 is what is left over. Assuming the invention is implemented to make the inner rectangle 815 a square with area 4s (each edge of the square having 2s pixels), the inner rectangle may be defined by vertices (x'-s, y'-s), (x'+s, y'-s), (x'+s, y'+s) and (x'-s, y'+s). Those skilled in the art will recognize other situations may alter this calculation. All touch events (regardless of which of rectangles 811-815 receives them) are processed by the extra-software layer 704, which, in addition to the dampened update of (x',y'), looks for the signal from the accessory 300.

As shown in FIG. 6, when the extra-software layer 704 detects the user is requesting a mode change via the accessory 300, the extra-software layer 704 destroys the v5 view 815 and makes view v1 811, view v2 812, view v3 813 and view v4 814. (Alternatively, if all five rectangles 811-815 were implemented as part of a single view 810, the extra-software layer 704 destroys view 810, and redraws four separate views: view v1 811, view v2 812, view v3 813 and view v4 814.) In both FIG. 5 and FIG. 6, the size and position of rectangles 811-814 remain the same, being calculated from (x',y') in coordinate memory 714, creating a central hole 815. During this destructive mode shown in FIG. 6, (x',y') and the associated positions of rectangles 811-814 are held fixed. Touch events inside the empty hole 815 centered on the fixed (x'y'), including those created autonomously by the extra-software layer 704 using the Android method dispatchGesture, are allowed to pass through to the underlying user application 701, such as the example at (300,400). Touch events on one of the views 811-814 are ignored. For example a touch event at (100,200) is prevented from causing inadvertent invocation. When accessory 300 is implemented as envisioned by patent application Ser. No. 14/708,572, it may be helpful to prevent a mode change if the accessory is touching inside view 815. Also, accessory 300 as envisioned by patent application Ser. No. 14/708,572 should not generate any touch events for a period longer than is necessary for the gesture to be dispatched by the extra-software layer 704. Otherwise, the accessory 300 might create inadvertent touch events. If the accessory is implemented with other input-output interfaces, such as such as microphone 102, audio jack 103, wireless transceiver 104, USB port 105, or other prior-art accessories like electric pens, these restrictions are not necessary. In either case, destructive mode should be prevented if there are any other touches (such as from a finger) on the screen at the time the mode change is requested. This can be accomplished by counting the UP and DOWN events received by the extra-software layer 704 while it displays the non-destructive mode shown in FIG. 5, and only change to the destructive mode shown in FIG. 6 (and dispatch the gesture) at the time the accessory button is pushed if the number of UP events equals the number of DOWN events.

After being in destructive mode (FIG. 6) for at least as long as required to dispatch the gesture, the extra-software layer returns to a non-destructive mode (FIG. 5). Optionally, to make the extra-software layer faster and more convenient, an Android-accessibility-service-callback mechanism can switch modes as soon as the user invokes the feature of user application 701 with the gesture dispatched near (x',y') that passed through hole 815.

Assuming that sx is half the size of the center rectangle 815 in the x direction, sy is half the size of the center rectangle 815 in they direction, w is the width of the pixel display 109 and h is the height of the pixel display 109, the following eight equations describe the coordinates of the five rectangles relative to (x',y'):

$$top=\max(y'-sy,0)$$

$$left=\max(x'-sx,0)$$

$$bottom=\min(y'+sy,h)$$

$$right=\min(x'+sx,w)$$

$$top2s=\max(y'+sy,0)$$

$$left2s=\max(x'+sx,0)$$

$$bottom2s=\min(y'-sy,h)$$

$$right2s=\min(x'-sx,w)$$

Most operating systems provide ways to draw rectangles within a view. For example, the Android operating system provides a rectangle-drawing method that is given the desired upper left and lower right corners and appropriate (in this case translucent) paint colors. Using this method, rectangles 811-814 can be drawn passing the above calculated coordinates as canvas.drawRect(0,0,left2s ,top,paintCurrent1);

canvas.drawRect(0,bottom2s ,left,h,paintCurrent2);

canvas.drawRect(right2s ,bottom,w,h,paintCurrent3);

canvas.drawRect(right,0,w,top2s,paintCurrent4);

Such an approach could be used for the non-destructive-mode implementation option in a single view. Such code would need to be re-executed every time (x',y') changes. For example, in the Android operating system, specifying the following in the onTouchEvent method (which is passed a motion event, ev), could allow updating of (x',y') in a dampened way suitable for motion-disabled users:

```
oldx=newx;
oldy=newy;
newx = ev.getX( );
newy = ev.getY( );
deltax = newx-oldx;
deltay = newy-oldy;
if  ((Math.abs(deltax)<sx)&&(Math.abs(deltay)<sy))
{  x' += damp*deltax;
   y' += damp*deltay;
}
```

The eight formula above for top, left, bottom, right, top2s, left2s, bottom2s and right2s would need to be re-computed after this, and the rectangles 811-814 would need to be redrawn. Assuming the view in which these rectangles are drawn captures all touch events, and this view is clear, the above have the effect of moving a clear rectangle 815 in response to swabbing motions that are captured by the onTouchEvent method regardless of which of the five rectangles 811-815 the user is touching during the swabbing motion. Such events are not allowed through to the underlying user application 701, which is, however, visible to the user because of the choice of translucent paint colors. This arrangement allows the user to select (x',y') deliberately without the stress of having to time hand motions according to operating-system requirements, and without regard to hand tremor and similar issues.

When the user chooses to change to destructive mode, a different approach will be needed in order to create an actual hole 815 centered on (x',y') that will allow actual touch events to fall through to the underlying user application 701. In the Android operating system, this could be done by defining a class that creates the parameters for such rectangular views:

```
public class MyRectParams extends WindowManager.LayoutParams
{ MyRectParams(int x1, int y1, int x2, int y2)
    {super(WindowManager.LayoutParams.WRAP_CONTENT,
        WindowManager.LayoutParams.WRAP_CONTENT,
        WindowManager.LayoutParams.TYPE_PRIORITY_PHONE,
        WindowManager.LayoutParams.-
        FLAG_NOT_TOUCH_MODAL
        | WindowManager.LayoutParams.FLAG_FULLSCREEN
        | WindowManager.LayoutParams.FLAG_NOT_FOCUSABLE
        | WindowManager.LayoutParams.-
        FLAG_LAYOUT_NO_LIMITS,
        PixelFormat.TRANSPARENT);
    this.gravity = Gravity.TOP|Gravity.LEFT;
    this.alpha = myAlpha;
    this.setRect(x1, y1, x2, y2);
    }
MyRectParams(float x1, float y1,float x2, float y2)
    { this(((int)x1), ((int) y1), ((int)x2), ((int) y2)); }
void setRect(int x1, int y1, int x2, int y2)
    { this.x = x1;
    this.y = y1;
    this.height = y2-y1+1;
    this.width = x2-x1+1;
    }
}
```

Using this class, and the Android-operating-system provided window manager, mgr, the four outside views 811-814 (labeled v1-v4 in FIG. 6) for destructive mode can be created as:

```
mgr.addView(v1,new MyRectParams(0,0,left2s-1,
    top-1));

mgr.addView(v2,new MyRectParams(0,bottom2s,
    left-1,h-1));

mgr.addView(v3,new MyRectParams(right2s,bottom,
    w-1,h-1));

mgr.addView(v4,new MyRectParams(right,0,w-1,
    top2s-1));
```

Those skilled in the art will recognize other actions need to occur, for example, destroying the view(s) of non-destructive mode. Also, those skilled in the art will realize there are many options for the choice of layout parameters for such rectangular views; the above choice is simply one alternative. For example, instead of TYPE_PRIORITY_PHONE the Android operating system provides other types that require SYSTEM_ALERT_WINDOW permission, like TYPE_SYSTEM_OVERLAY. Five-rectangle filtering is flexible to accommodate many such variations.

Those skilled in the art will recognize many variations in the appearance of the views are possible within the framework of five-rectangle filtering. For example, additional rectangles could included to make a more irregularly-shaped hole. Also, instead of signaling mode via translucent paint colors, dithering or other visual effects can give the user feedback about the extra-software-layer mode. Because the destructive mode is autonomously entered only long enough to dispatch a gesture, it may or may not need to have a distinct appearance.

FIGS. 7-9 give three alternative implementations of accessory 300. Referring to FIG. 7, accessory 300 may be implemented as an active stylus, with the additional element of a plastic guard 198 that covers operating-system menu 199, preventing the stylus or finger from touching menu 199. (User activation of the menu 199 will be accomplished via the extra-software layer 704 as described later.) In order to allow an intermittent signal to be transmitted to touchscreen 101, the user's hand 200 touches a conductive surface 301. In a normal stylus, the capacitance, $C_X$, 376 would be large enough to register the (x,y) coordinate on the touchscreen 101; however, since FIG. 7 shows an active stylus, $C_X$ is chosen to be small enough that when the active-stylus circuit 370 is not powered, the touchscreen 101 will not register $C_X$, nor will it register the tip capacitance, $C_S$. In other words, though the choice of the geometry and dialectric material(s), the values of $C_X$ and $C_S$ are chosen to be smaller than $C_U$. As part of the active-stylus circuit 370, conductive surface 301 is connected to an amplifying buffer 373 via wire 302, having the effect of driving the conductive surface 301 and correspondingly the user's hand 200 in response to signal 374. Power for buffer 373 comes from wires 372 and 377 provided from a high-voltage converter 371, itself powered by battery 354 via wires 355 and 356. Those skilled in the art will realize high-voltage conversion may be eliminated by choosing battery 354 to have the appropriate voltage to power buffer 373. Unlike the prior art, circuit 370 receives a control signal 304. Control signal 304 controls whether high-voltage converter 371 powers buffer 373. If control signal 304 is active, circuit 370 functions as an active-stylus circuit causing a touch event to be registered at the (x,y) coordinate on touchscreen 101. If control signal 304 is not active, circuit 370 is disabled, meaning touch events will not be registered on touchscreen 101. Those skilled in the art will realize other methods to disable circuit 370 are possible, such as replacing buffer 373 with a logic gate that drives the output 302 to similar voltages as a logical AND function of the input signals 304 and 374. In any case, signal 374 is provided by another amplifier 375 (typically powered by the same supply wires 372 and 377). Those skilled in the art will realize other components connected to amplifier 375, such as resistors and capacitors, may enhance its ability to discriminate the small-voltage high-frequency signals caused by the charging and discharging of touchscreen 101. For example, amplifier 375 might be configured as a charge integrator. Tip 307 is on the exterior surface of one end of accessory 300. The capacitance, Cs, 201 that couples tip 307 to touchscreen 101 is lower than would be required to register a touch event on touchscreen 101, that is less than $C_U$. Typically this has been accomplished by the geometry of tip 307, ie making it as small as a ball-point pen. In this application, the active-stylus circuit 370 is not intended to be used for drawing or handwriting by a non-disabled user, and so other methods of lowering this capacitance are possible, such as choosing the thickness or dielectric constant for tip 307 that might be larger than a ball point pen to make it a more appropriate size for a motion-disabled user. When control signal 304 is active, circuit 370 is powered, and, as a result circuit 370 being active, the scanning of touchscreen 101 will be picked up via capacitance 201, tip 307, wire 308, amplifier 375, wire 374, buffer 373, wire 302 and surface 301, which in turn feeds back to touchscreen 101 via capacitance 376 thereby registering a touch event. Control circuit 350 is powered by battery 354 via wires 355 and 356. A push button 353 is positioned where it is convenient for the user to activate it. The push button 353 is connected to control circuit 350 via wires 351 and 352. The user can hold the accessory 300 with tip 307 on touchscreen 101 without activating the push button 353. The user manipulates push button 353 to select between two distinct timing patterns that are communicated to extra-software layer 705 via buffer 373, wire 302, surface 301 and capacitance 376. Optionally, control circuit 350 may be connected via bus 358 to additional user-interface transducer(s) 357 to select among more than two distinct timing patterns to be communicated to extra-software layer 704 via tip 307.

Referring to FIG. 8, accessory 300 may be implemented as a glove which fits around the user's hand 200 inspired by apparatus disclosed in patent application Ser. No. 14/708, 572, with the additional element of a plastic guard 198 that covers operating-system menu 199 preventing the gloved finger from touching menu 199. (User activation of the menu 199 will be accomplished via the extra-software layer 704 as described later.) The insulating material used to make the glove accessory 300 has a sufficient dielectric constant to make capacitive interaction between the hand 200 and the touchscreen 101 negligible; in other words, in the absence of the other novel components of the present invention, the glove material will exhibit the typical complaint users express about not being able to use touchscreen devices whilst using gloves. In order to allow intermittent electrical connection of the user's hand 200 to the touchscreen 101, a conductive surface 301 is provided inside the interior of glove 300. Those skilled in the art will recognize many materials could be used to provide this conductive surface, such as conductive cloth, metal foil, etc. The size, shape and placement of the conductive surface 301 should maximize the coupling to the hand 200, minimize coupling to the touchscreen 101, and be unobtrusive to the user. For example, the back of the hand represents a good compromise of these traits. Those skilled in the art will recognize many other possible sizes, shapes and placements for the conductive surface 301. Conductive surface 301 is connected to an electrically-controlled switch 303 via wire 302. Wire 302 and electrically-controlled switch 303 should be placed to avoid excessive coupling with touchscreen 101, such as on top of the finger 204. Electrically-controlled switch 303 is connected via bus 304 to control circuit 350. Those skilled in the art will recognize control circuit 350 may be implemented in a variety of ways, such as digital logic and/or microprocessor circuits. Control circuit 350 is powered by battery 354 via wires 355 and 356. All electrically-controlled switches have some inherent parasitic capacitance 305 parallel to the switch (measured as $C_P$ picofarads when the switch is open) and parasitic resistance 306 in series to the switch (measured as $R_P$ Ohms when the switch is closed). It is desirable to choose electrically-controlled switch 303 so as to minimize $C_P$. The electrically-controlled switch 303 is connected via wire 308 to conductive tip 307 which is coupled to touchscreen 101 via $C_S$ capacitance 201. In turn, touchscreen 101 is coupled back to the hand 200 via $C_C$ capacitance 203, similar to the situation when the novel accessory is not employed. When electrically-controlled switch 303 is closed and tip 307 is touching the touchscreen 101, the effective capacitance between hand 200 and touchscreen 101 is $C_E=1/(1/C_C+1/C_S)$, again similar to the situation when the novel accessory 300 is not employed and finger 204 touches the touchscreen 101 directly. When electrically-controlled switch 303 is open and tip 307 is touching the touchscreen 101, the capacitance between hand 200 and touchscreen 101 is $C_O=1/(1/C_E+1/C_P)$ which is distinct from the capacitance, $C_U$ (when the novel accessory 300 is not employed and finger 204 does not touch the touchscreen 101). In order for the open state of the electrically-controlled switch 303 when tip 307 touches the touchscreen 101 to be perceived by touchscreen 101 as the same as the unaided finger 204 not touching the touchscreen 101, the electrically-controlled switch 303 must have $C_P$ capacitance 305 significantly less than $C_E$, so that $C_O$ is approximately the same as $C_P$. Choosing $C_P$ the same as or larger than $C_E$ would make $C_O > C_E/2$, in which case it is unlikely touchscreen 101 would register the change between $C_E$ and $C_O$ as UP and DOWN events. Depending on the sensitivity of touchscreen 101, it may be necessary to make $C_P$ as small as $C_U$. On the exterior surface of glove 300, tip 307 is positioned near the point where glove 300 covers the tip of finger 204. Relatedly, on the interior surface of glove 300, a push button 353 is positioned near the point where the glove 300 covers the tip of finger 204. The push button 353 is connected to control circuit 350 via wires 351 and 352. The user's finger 204 may rest on the physically-attached combination of push button 353, glove 300 and tip 307 without activating the push button 353.

Referring to FIG. 9, accessory 300 may be implemented as wireless peripheral. There are many such devices on the market, including camera shutters (e.g., ShutterBall™), large accessibility switches (e.g. Blue2™ for more severely disabled individuals), game paddles and most wireless keyboards. Those skilled in the art can imagine many similar devices. All of these devices share a similar structure to the one outlined in FIG. 9. Unlike FIGS. 7-8, the user interacts with extra-software layer 704 to modify (x',y') using a bare finger, but triggers the extra-software layer 704 to dispatch a gesture using button 353 on wireless peripheral 300. Like FIGS. 7-8, FIG. 9 includes plastic guard 198 that covers operating-system menu 199, preventing the user's finger from touching menu 199. (User activation of the menu 199 will be accomplished via the extra-software layer 704 as described later.) Control circuit 350 is powered by battery 354 via wires 355 and 356. A push button 353 is positioned where it is convenient for the user to activate it. The push button 353 is connected to control circuit 350 via wires 351 and 352. The user manipulates push button 353 to cause control-circuit 350 to send a transmission signal 304 to wireless transmitter 399, which in turn uses a protocol like Bluetooth or Bluetooth Low-Energy to transmit to wireless transceiver 104 on touchscreen 100.

Regardless of the implementation of accessory 300, the extra-software layer 704 provides a plurality of non-destructive modes, each displayed with distinguishable visual characteristics (such as a translucent color, dithering, or crosshatch). Such additional modes allow the extra-software layer 704 to provide extra assistance to the motion-disabled user in contexts like scrolling or zooming. Depending on which non-destructive mode is in effect when the user activates accessory 300, the way in which the extra-software layer 704 dispatches gestures during the momentary time in destructive mode will be changed. Referring to FIGS. 5 and 10, in order to allow for multiple modes, the view 810 (consisting of rectangles 811, 812, 813 and 814) needs to allow the user a method for changing modes which will change the visual appearance of rectangles 811, 812, 813 and 814. When the extra-software layer 704 is in a particular mode, the rectangles 811, 812, 813 and 814 all are displayed in a similar theme such as a particular first translucent color, or for the purposes of illustration in FIGS. 10-13, a first kind of cross-hatching (diagonal). The individual rectangles may have a distinct intensity or other characteristic as shown in FIG. 10 for clarity or they may have identical visual appearance, but in any instance the overall visual appearance is chosen to communicate to the user the extra-software layer 704 is in a mode that corresponds to this appearance. In the preferred embodiment, there will be three non-destructive modes identifiable both by the numbers 1, 2 and 3 (which are displayed inside rectangle 815) as well as by corresponding visual appearances. Those skilled in the art will realize the extra-software layer could allow the user to configure the visual appearance/color to suit the user's tastes, including the option of making all rectangles visually transparent. In this case they would still capture the motion events, and the user could still recognize the current non-destructive mode from the visual indicator provided by the digit 1, 2 or 3.

The coordinate system in FIG. 10 ranges from $0<x'<w$ and $0<y'<h$, where h is the height of the view 810 (possibly excluding operating-system menu 199) and w is the width of the view 810. As described earlier, the primary purpose of (the typically clear) rectangle 815 is to communicate the current $(x',y')$ value of the coordinate memory 714 to the user and to allow the user to modify this value with dampened swabbing motions that allow the motion-disabled user to select the desired $(x',y')$ successfully. At a later time (in destructive mode) when touch events are sent to underlying application 701, $(x',y')$ will be inside the view 810 whose range is $0<x'<w$ and $0<y'<h$. Values of x' and/or y' outside this range will never occur in destructive mode. This means such values may be used in non-destructive mode to signal mode changes. In the preferred embodiment, each time the user swabs the rectangle 815 outside this range and then back inside this range, the mode changes in a cycle such as 3, 2, 1, 3, 2, 1 . . . . If, as shown in FIG. 1, operating-system menu 199 is at the bottom of the screen, y'>h should not cause a mode change. Those skilled in the art will understand similar restrictions on x' and y' for different operating-system arrangements. Also, those skilled in the art will realize alternative ways could signal non-destructive mode changes, such as extra transducer 357.

Referring to FIG. 11, if the user swabs the center rectangle 815 to the left, eventually the left-most edge of rectangle 815 will disappear from the screen (being shown in FIG. 11 as a dotted line only for illustration). Mathematically, this could be recognized in step 905 when x'<sx. At this point, the extra-software layer 704 displays a narrow vertical band 816 with a distinctive second visual appearance (representing a potential mode change). To illustrate this in FIG. 11, a second kind of cross-hatching is used in band 816 (horizontal cross-hatch instead of diagonal cross-hatch). (Those skilled in the art will realize many other visual appearances could be used, such as a second translucent color). If the user has moved the center rectangle 815 to the edge of view 810 by mistake, swabbing to the right will cause band 816 to disappear, and the mode (represented by diagonal cross-hatching) will remain in effect as shown previously in FIG. 10.

On the other hand, if the user intends to switch to this different (horizontal cross-hatched) non-destructive mode, continued swabbing to the left will cause x'<0. Referring to FIG. 12, the visual theme of rectangles 811, 812, 813 and 814 change to something similar to that of band 816 (horizontal cross-hatching in this example), and the internal mode 715 of extra-software layer 704 changes. Referring to FIG. 13, the user may then swab away from the edge of view 810 and choose a new value for the $(x',y')$ coordinate memory 714 to be used in this new (horizontal cross-hatched) mode The extra-software layer 704 uses accessory 300 to initiate gestures of three kinds, depending on which non-destructive mode 715 the user previously selects with the change-by-swabbing technique off the edge of the screen as illustrated in FIGS. 10-13. The user may change the position of the square 815 centered on $(x',y')$ by swabbing (in a damped way) anywhere on the screen, allowing accurate positioning despite artifacts like tremor.

Each distinctive appearance represents a distinct mode, which is also represented by a number (displayed in the center of the clear square). The number tells how many distinct $(x',y')$ coordinate(s) will be input in that mode before the dispatchGesture composed from those coordinates will be sent to the underlying application. In mode 2, the first button push saves $(x',y')$ as (swipeX, swipeY). In mode 3, the first two pushes save both (swipeX, swipeY) and (zoomX, zoomY). When these are invisible, (swipeX, swipeY) and (zoomX, zoomY) are represented by the (−1,−1) which is outside the visible screen.

In order for the touch event(s) that will be created autonomously by dispatchGesture to be received by the underlying application, hole 815, centered on the first of those coordinate(s), is created by the five-rectangle filtering technique described above. From this point on, all the actions are autonomous, requiring no further user interaction. The destructive view (like that shown in FIG. 6) is displayed only for a time in milliseconds slightly longer than the time required for the dispatchGesture (possibly terminated by a call back from the Accessibility Service or a timeout). When accessory 300 is implemented as envisioned by patent application Ser. No. 14/708,572 (FIGS. 7-8), the UP/DOWN pattern that triggers this action generated by accessory 300 is followed by a period (longer than the dispatchGesture time) in which accessory 300 is deactivated before being reactivated (after reactivation, accessory 300 may again be used to move the clear square). When accessory 300 is implemented with other input-output interfaces (FIG. 9), such as such as microphone 102, audio jack 103, wireless transceiver 104, USB port 105 or prior-art devices like electric pens, the extra-software layer aborts five-rectangle filtering if anything remains touching the screen (the number of DOWN events is greater than the number of UP events). These measures prevent manually created touch events from interfering with the automatically created touch events.

In mode 1, a single button push makes short (~300 ms) taps at $(x',y')$. Each button push creates a corresponding dispatchGesture while in this mode.

In mode 2, usually two button pushes create a visible arrow on the view 810 pointing in the direction the user wishes to scroll towards. (This is the opposite direction from which a non-disabled user's finger would move to accomplish this, but since the disabled user is not kinetically implementing the gesture, it is more natural to think in terms of the effect on the object being manipulated.) This is the normal operation when the two coordinates that define the arrow are significantly different from each other (ie, the arrow is not tiny) and these are different than the initial $(x',y')$. Referring to FIGS. 13-14 which illustrated mode 2, assume for example the user has pushed the accessory button 353 once when $(x',y')$ is as shown in FIG. 13 and then swabbed the center rectangle 815 down as shown in FIG. 14. The rectangles 811-814 in FIG. 14 remain the same horizontal cross-hatching reflecting the same mode 715 as displayed previously (the digit '2' near the (x',y') location 714). A visible arrow 821 has been drawn on the screen between the location where the user pushed button 353 (swipeX, swipeY) and the arrowhead at the current (x',y'). The operating-system method dispatchGesture uses these two coordinates to create a scroll gesture. After dispatchGesture issues this swipe motion, this arrow persists until the clear square at (x',y') moves a modest distance (~sx). There are two special cases. First, if after the previous scroll the user presses the button once without moving the clear square that modest distance, the same swipe is repeated, allowing an easy way to do multiple scrolls. Second, if after moving a modest distance, the user hits the button at essentially the same coordinate twice, dispatchGesture creates a long (~700 ms) tap.

In mode 3, three button pushes first create an arrow (defined by saved values of previous points: swipeX swipeX zoomX and zoomY) finally a circular pivot at the current (x',y'). Together, these three coordinates used for zoom and rotation. The pivot is like a stationary thumb, where the index finger follows the path outlined by the arrow. (Essentially all useful mathematical transformations that a non-disabled user could create are available to the disabled user using only three coordinates with the pivot stationary.) The pivot is displayed as two concentric circles. The size of the inner circle reflects the extent of magnification/demagnification (absolute value of the logarithm of a ratio, somewhat analogous to definitions like dB and pH, of the distances from the pivot (x',y') to the other saved coordinates, (swipeX, swipeY) and (zoomX, zoomY):

$$distSwipe = (x'-swipeX)^2 + (y'-swipeY)'$$

$$distZoom = (x'-zoomX)^2 + (y'-zoomY)^2$$

$$circSize = \min(30, |10 \log 10(distSwipe/distZoom) + 10|)$$

Square root calculations are not required as the scaling of the logarithm accomplishes the same effect. The color or visual appearance of the outer circle indicates whether magnification or demagnification (depending on whether distZoom<distSwipe) will occur on the next button push. The pivot is only displayed after the two earlier coordinates representing the arrow have been entered after the second push. A special case occurs when the user does not move the square a modest distance (~sx) after the second push. In this case, the inner circle will not have been displayed, and the two coordinates will have been treated as a scroll without have to switch back and forth to mode 2.

As an illustration of mode 3, consider FIG. 15. This shows what would be displayed if FIGS. 13-14 had occurred in mode '3', the user had pushed the accessory button 353 twice and then had swabbed the center rectangle 815 even further down. The rectangles 811-814 are shown as dots reflecting the mode 715 displayed as the digit '3' near the (x',y') location 714. The visible arrow 821 was previously created between the location where the user pushed the button 353 first (swipeX, swipeY) and the arrowhead where the user pushed the button 353 second (zoomX, zoomY). Near the current (x',y') is the pivot 821. In this case, if the user were to push accessory button 353 a third time, dispatchGesture would issue a zoom gesture, that in many underlying apps that accept such gestures, would magnify and slightly scroll the content the underlying app will display.

If the user is not happy with the arrow being created in mode 2 or 3, it can be erased with change-by-swabbing (if necessary, multiple times to get back to the same mode). Usually, until the number of button pushes associated with the mode have happened, the user is not locked into any action.

Appendix 1 gives pseudo code that implements the basic actions these three modes cause at the time each accessory button 353 push occurs. (Some details like repeated scrolling were omitted for brevity.) In addition to the variables discussed above, this pseudo code uses mode as the digit representation of mode 715, downCount (whose computation is not shown) as the difference of the number of UP and DOWN events since the last mode change, gestureTime as the number of milliseconds that the dispatched gesture will take, p and p1 as paths (points or lines that help form a gesture). The concurrent code that creates visual appearances like FIGS. 10-15 is not shown, but is driven by the variables in the psudeo code: if mode==1, only the five rectangles centered on (x',y') are displayed; if mode==2, additionally the arrow 821 will be displayed when swipeX !=-1; if mode==3, additionally the arrow 821 will be displayed when zoomX !=-1 and the pivot will also be displayed using the logarithmic computation given earlier when swipeX !=-1. The updating of mode and (x',y') is not shown in the pseudo code, but occurs in the onTouchEvent method discussed earlier.

Those skilled in the art will realize may other ways of describing the pseudo code would yield an effectively equivalent method. For example, Appendix 1 reuses the top half of the pseudo code for both modes 1 and 2. A simpler equivalent description, given in Appendix 2, has separate portions of the pseudo code for mode 1 and mode 2. The more explicit Boolean conditions that trigger each step in Appendix 2 are equivalent to the nested if else statements in Appendix 1. Because the Boolean conditions specified in Appendix 2 are mutually exclusive, it is irrelevant whether the pseudo code is expressed with else statements. Also, the order in which those conditions are tested in Appendix 2 is irrelevant. Those skilled in the art will realize there are many such transformations that would be within the scope of the present invention. For simplicity, Appendix 2 omits the optional steps of generating the error message "remove hand" and of clipping coordinates that are out of range. Appendix 1 uses the term "mode" in two distinct ways consistent with earlier usage in this specification: a) "non-destructive" (FIG. 5) versus "destructive" (FIG. 6) mode where the nature of the translucent view determines whether it captures all motion events (also known as touch events) that otherwise would be received by the underlying application, and b) a variable mode that holds an integer which changes the kind of gesture dispatched by the method. The appearance (color, cross-hatching, etc) of the non-destructive views (FIGS. 10-15) is in part determined by the variable mode. To avoid confusion, Appendix 2 uses the terms "disabling" and "enabling" in reference to the capturing of motion events, instead of the terms "destructive" and "non-destructive". Appendix 1 has a comment indicating that a callback from the dispatch gesture (as would happen in the Android operating system) would automatically enable the capture of motion events; for clarity, Appendix 2 makes this an explicit step because, as those skilled in the art will realize, different operating systems may take a different approach. Both appendices use the constants 300 and 700 milliseconds for short and long gesture times respectively; those skilled in the art will realize that values close to these are likely optimal but there may be considerable freedom to chose other values while maintaining functionality. Both appendices use the small constant 10 pixels to determine whether a long tap or a scroll is dispatched when mode==2. Those those skilled in the art will realize there is considerable freedom to chose a different value for this small constant. Both appendices use the Manhattan distance metric, abs (swipeX–x')+abs (swipeY–y'), when comparing against this small constant. Those skilled in the art will realize a Euclidean distance metric or similar metric could have been used. Both appendices use the constant –1 (which is outside the visible range of coordinates) to indicate when zoomX and swipeX have not been established earlier by the user; those skilled in the art realize many other approaches could have been used to make this distinction.

The neuromuscular conditions that cause motion disability often may cause mild intellectual impairment, and such users may have difficulty keeping track of the three modes described in Appendices 1 and 2. Those skilled in the art will realize the zoom/rotate case of mode==3 is infrequently used, and could be hidden from such users by limiting the value of mode to 1 and 2, and/or by omitting the code for mode==3.

CONCLUSION, RAMIFICATIONS, AND SCOPE

Accordingly, the reader will see that, according to one embodiment of the inventions, we have provided an accessory (300) that communicates to an extra-software layer (704) that also captures touch events on a touchscreen (101). The touchscreen (101) recognizes changes in (x,y) coordinates where touch events occur, allowing the extra-software-layer (704) to compute, in response to swabbing motions by a motion-disabled user, an (x',y') coordinate (714) shown on the pixel display (109) in the form of five translucent rectangles (811-815), allowing the user separately to 1) choose (x', y') non-destructively and 2) invoke an action associated with that (x',y'). The extra-software layer (704) conceals the (x',y') information from the underlying application (701) until the user pushes a button (353) on the accessory (300) to invoke an action associated with that coordinate. At that stage, the extra-software layer (704) changes the visual appearance of the rectangles (811-814), indicating a destructive mode, and leaves a rectangular hole (815) that allows a touch event dispatched according to a mode (715) in a region near (x',y') to be communicated to the underlying application (701). After feedback from the application (701) or a short period elapses, the extra-software layer (701) reverts in appearance and function to non-destructive mode. The preferred embodiment supports three modes corresponding to one button (353) push for tap; two button (353) pushes for scroll; and three button (353) pushes for zoom and rotate.

While the above description contains many specificities, these should not be construed as limitations on the scope of any embodiment, but as exemplifications of various embodiments thereof. Many other ramifications and variations are possible within the teachings of the various embodiments. For example, the above has illustrated these concepts in the context of the Andorid operating system. Those skilled in the are will recognize similar concepts could be implemented in other operating systems, such as iOS.

Thus, the scope should be determined by the appended claims and their legal equivalents, and not by the examples given.

Appendix 1: Pseudo Code when Button 353 Recognized by Extra-Software Layer 704

```
if ((mode==2)&&(swipeX==-1))
 {if ((x'>=0)&&(x'<w)&&(y'>=0))
   { swipeX = x'; swipeY = y';}}
else if ((mode==1)||(mode==2))
 {if (downCount!=0)
   {error message "remove hand";)
  else
   {if ((x'>=0)&&(x'<w)&&(y'>=0))
    {gestureTime = 300;
     Create p as moveTo(x',y');
     if ((mode==2)&&(abs(swipeX-x')+abs(swipeY-y')>=10))
       Modify p to include lineTo(swipeX, swipeY);
     if ((mode==2)&&(abs(swipeX-x')+abs(swipeY-y')<10))
       gestureTime = 700;
     swipeX = -1; swipeY = -1;
     Change to destructive mode;
     Dispatch gesture of p for gestureTime;
     //auto back to non-destructive
    }}}
else //mode==3
 { if ((zoomX==-1))
   {if ((x'>=0)&&(x'<w)&&(y'>=0)&&(y'<h))
    { zoomX = x'; zoomY = y';}}
   else if ((swipeX==-1))
    {if ((x'>=0)&&(x'<w)&&(y'>=0)&&(y'<h))
      { swipeX = x'; swipeY = y';}}
   else
    {if (downCount!=0)
      {error message "remove hand";}
     else
      {if ((x'>=0)&&(x'<w)&&(y'>=0)&&(y'<h))
       { gestureTime = 300;
        Create path p1 as moveTo(x',y');
        Create path p as moveTo(swipeX,swipeY);
        Modify path p to include lineTo(zoomX,zoomY);
        swipeX = -1; swipeY = -1;
        zoomX = -1; zoomY = -1;
        Change to destructive mode;
        Dispatch gesture of p and p1 for gestureTime;
        //auto back to non-destructive
}}}}}
//p starts later than p1 so focus is at (x',y')
```

Appendix 2: Essentially Equivalent Pseudo Code as Appendix 1

```
if (mode==1)
 { gestureTime = 300;
   Create p as moveTo(x',y');
   Disable capturing of motion events;
   Dispatch gesture of p for gestureTime;
   Enable capturing of motion events;
 }
if ((mode==2)&&(swipeX==-1))
 { swipeX = x'; swipeY = y';}
if ((mode==2)&&(swipeX!=-1))
 { gestureTime = 300;
   Create p as moveTo(x',y');
   if (abs(swipeX-x')+abs(swipeY-y')>=10)
     Modify p to include lineTo(swipeX, swipeY);
   if (abs(swipeX-x')+abs(swipeY-y')<10)
     gestureTime = 700;
   swipeX = -1; swipeY = -1;
   Disable capturing of touch events;
   Dispatch gesture of p for gestureTime;
   Enable capturing of touch events;
 }}
if ((mode==3) && (zoomX==-1))
     { zoomX = x'; zoomY = y';}
if ((mode==3) && (zoomX!=-1) && (swipeX==-1))
     { swipeX = x'; swipeY = y';}
```

-continued

```
if ((mode==3) && (zoomX!=-1) && (swipeX!=-1))
    {       gestureTime = 300;
            Create path p1 as moveTo(x',y');
            Create path p as moveTo(swipeX,swipeY);
            Modify path p to include lineTo(zoomX,zoomY);
            swipeX = -1; swipeY = -1;
            zoomX = -1; zoomY = -1;
            Disable capturing of touch events;
            Dispatch gesture of p and p1 for gestureTime;
            Enable capturing of touch events;
}}}
```

What is claimed:

1. A method for dispatching gestures on behalf of a motion-disabled user assisted by an accessory with at least a first button for a touchscreen device having a pixel display and visible coordinate range w by h pixels, wherein w defines the width of the pixel display and h defines the height of the pixel display and having a processor running an underlying application and running an extra software layer, said method carried out by said extra software layer including the steps of:
  initializing coordinates values (x',y'), (swipeX,swipeY), (zoomX,zoomY) and a mode value;
  displaying on said touchscreen a translucent layer that provides a visual indicator of the most recent values of said (x',y') and of said mode value on each occasion said values change;
  capturing motion events from said user by said translucent layer, whereby said capturing of said motion events can be enabled and disabled, thereby preventing said motion events from reaching said underlying application when said capturing is enabled, and thereby allowing at least some of said motion events to reach said underlying application when said capturing is disabled;
  adjusting said (x',y') by the product of a constant and a vector difference between coordinates of the two most recent of said motion events obtained by said step of capturing;
  changing said mode value, thereby yielding a new mode value, in response to a request from said user;
  selecting one of the following steps when said user pushes said first button:
  performing a first gesture composed from said (x',y') when said mode value equals 1;
  saving said (x',y') as said (swipeX ,swipeY) when said mode value equals 2 and said swipeX equals -1;
  performing a second gesture composed from said (x',y') and said (swipeX,swipeY) when said mode value equals 2 and said swipeX does not equal -1;
  saving said (x',y') as said (zoomX,zoomY) when said mode value equals 3 and said zoomX equals -1;
  saving said (x',y') as said (swipeX,swipeY) when said mode value equals 3 and said zoomX does not equal -1 and said swipeX equals -1;
  performing a third gesture composed from said (x',y'), said (swipeX,swipeY) and said (zoomX,zoomY) when said mode value equals 3 and said zoomX does not equal -1 and said swipeX does not equal -1.

2. The method of claim 1 wherein said step of performing said first gesture comprises:
  creating said first gesture as a short tap consisting of a move to said (x',y');
  disabling said step of capturing;
  dispatching said first gesture whereby said first gesture will be received by said underlying application; and
  enabling said step of capturing.

3. The method of claim 2 wherein said step of performing said second gesture comprises:
  creating said second gesture as a scroll consisting of a path from said (x',y') to said (swipeX,swipeY);
  setting said (swipeX,swipeY) to (-1,-1);
  disabling said step of capturing;
  dispatching said second gesture whereby said second gesture will be received by said underlying application; and
  enabling said step of capturing.

4. The method of claim 3 wherein said step of changing said mode value includes selecting one of the following:
  setting said new value of said made value to 2 when said mode value equals 1;
  setting said new value of said mosie value to 1 when said mode value equals 2.

5. The method of claim 4 wherein said step of displaying further includes displaying an arrow from said (swipeX, swipeY) to said (x',y') when said mode value equals 2 and said swipeX does not equal -1.

6. The method of claim 2 inwherein said step of performing said second gesture comprises:
  creating said second gesture as a long tap consisting of a move to said (x',y') when the distance between said (x',y') and said (swipeX,swipeY) is less than or equal to a second constant;
  creating said second gesture as a scroll consisting of a path from said (x',y') to said (swipeX ,swipeY) when said distance between said (x',y') and said (swipeX, swipeY) is greater than said second constant;
  setting said (swipeX,swipeY) to (-1,-1);
  disabling said step of capturing;
  dispatching said second gesture whereby said second gesture will be received by said underlying application; and
  enabling said step of capturing.

7. The method of claim 6 wherein said step of performing said third gesture comprises:
  creating said third gesture as a zoom/rotate consisting of a move to said (x',y') and a path from said (swipeX, swipeY) to said (zoomX,zoomY);
  setting said (swipeX ,swipeY) to (-1,-1);
  setting said (zoomX,zoomY) to (-1,-1);
  disabling said step of capturing;
  dispatching said third gesture whereby said third gesture will be received by said underlying application; and
  enabling said step of capturing.

8. The method of claim 7 wherein said step of changing said mode value is triggered when said step of adjusting initially makes said (x',y') be outside the bounds of said visible coordinate range and wherein said step of changing said mode value includes selecting one of the following:
  setting said new value of said mode value to 2 when said mode value equals 1;
  setting said new value of said mode value to 3 when said mode value equals 2;
  setting said new value of said mode value to 1 when said mode value equals 3.

9. The method of claim 8 wherein said step of changing said mode value further includes:
  setting said (swipeX,swipeY) to (-1,-1); and
  setting said (zoomX,zoomY) to (-1,-1).

10. The method of claim 8 wherein said step of adjusting further includes:

displaying one or more translucent colored bands indicative of the next value of said mode value when said (x',y') is near said bounds of said visual coordinate range; and clipping said (x',y') when said (x',y') is outside said bounds of said visual coordinate range.

11. The method of claim 7 wherein said step of displaying further includes:

displaying a digit near said (x',y'), wherein said digit corresponds to the integer value of said mode value;

displaying an arrow from said (swipeX,swipeY) to said (x',y') when said mode value equals 2 and said swipeX does not equal −1;

displaying an arrow from said (zoomX,zoomY) to said (x',y') when said mode value equals 3 and said zoomX does not equal −1 and said swipeX equals −1; and displaying a pivot symbol and an arrow from said (zoomX,zoomY) to said (swipeX,swipeY) when said mode value equals 3 and said zoomX does not equal −1 and said swipeX does not equal −1, wherein the size of said pivot symbol is a logarithmic function involving said (x',y'), said (zoomX,zoomY) and said (swipeX, swipeY).

12. The method of claim 7 wherein said steps of disabling said step of capturing further includes:

destroying said translucent layer; and displaying a replacement layer composed of a hole, centered on said (x',y'), which does not capture said motion events, surrounded by up to four translucent rectangular views, which do capture said motion events;

thereby allowing said steps of dispatching said gestures, composed in part from said (x',y'), to be received by said underlying application.

13. The method of claim 12 wherein said steps of enabling said step of capturing further includes:

destroying said replacement layer; and redisplaying said translucent layer;

thereby providing visual indicators of said (x',y') and of said mode value, and thereby preventing said motion events from being received by said underlying application.

14. The method of claim 7 wherein said step of initializing further includes: setting said mode value to −1;

setting said (x',y') to a point within said visual coordinate range; setting said (swipeX,swipeY) to (−1,−1); and setting said (zoomX,zoomY) to (−1,−1).

15. A method for dispatching gestures on behalf of a motion-disabled user assisted by an accessory with at least a first button for a touchscreen device having a pixel display and visible coordinate range w by h pixels, wherein w defines the width of the pixel display and h defines the height of the pixel display and having a processor running an underlying application and running an extra software layer, said method carried out by said extra software layer including the steps of:

initializing coordinate values: (x',y'), (swipeX,swipeY), (zoomX,zoomY), and distance values: sx, sy, and mode value;

computing, based on said (x',y'), said sx, said sy, said h and said w, updated values for top as max(y'−sy,0), left as max(x'−sx,0), bottom as min(y'+sy,h), right as min(x'+sx,w), top2s as max(y'+sy,0), bottom2s as min(y'−sy,h) and right2s as min(x'−sy,w);

displaying on said touchscreen a translucent layer, which provides a clear rectangular visual indicator, proportional in size to sx and sy centered on the most recent value of said (x',y'), said step of displaying said translucent layer including the steps of:

displaying a digit near said (x',y'), wherein said digit corresponds to the integer value of said mode value;

displaying an arrow from said (swipeX,swipeY) to said (x',y') when said mode value equals 2 and said swipeX does not equal −1;

displaying an arrow from said (zoomX,zoomY) to said (x',y') when said mode value equals 3 and said zoomX does not equal −1 and said swipeX equals −1;

displaying a pivot symbol and an arrow from said (zoomX,zoomY) to said (swipeX,swipeY) when said mode value equals 3 and said zoomX does not equal −1 and said swipeX does not equal −1, wherein the size of said pivot symbol is a logarithmic function involving said (x',y'), said (zoomX,zoomY) and said (swipeX, swipeY);

displaying a first translucent rectangle with corners (0,0) and (left2s,top); displaying a second translucent rectangle with corners (0,bottom2s) and (left,h); displaying a third translucent rectangle with corners (right2s, bottom) and (w,h); and displaying a fourth translucent rectangle with corners (right,0) and (w,top2s);

capturing motion events from said user by said translucent layer, whereby said capturing of said motion events can be enabled and disabled, thereby preventing said motion events from reaching said underlying application when said capturing is enabled, and thereby allowing at least some of said motion events to reach said underlying application when said capturing is disabled;

adjusting said (x',y') by the product of a constant and a vector difference between coordinates of the two most recent of said motion events obtained by said step of capturing;

changing said mode value, thereby yielding a new value of said mode value, when said step of adjusting initially makes said (x',y') be outside the bounds of said visible coordinate range; and selecting one of the following steps when said user pushes said first button:

performing a first gesture composed from said (x',y') when said mode value equals 1;

saving said (x',y') as said (swipeX,swipeY) when said mode value equals 2 and said swipeX equals −1;

performing a second gesture composed from said (x',y') and said (swipeX,swipeY) when said mode value equals 2 and said swipeX does not equal −1;

saving said (x',y') as said (zoomX,zoomY) when said mode value equals 3 and said zoomX equals −1;

saving said (x',y') as said (swipeX,swipeY) when said mode value equals 3 and said zoomX does not equal −1 and said swipeX equals −1;

performing a third gesture composed from said (x',y'), said (swipeX,swipeY) and said (zoomX,zoomY) when said mode value equals 3 and said zoomX does not equal −1 and said swipeX does not equal −1.

16. The method of claim 15 wherein said step of performing said first gesture comprises:

creating said first gesture as a short tap consisting of a move to said (x',y');

disabling said step of capturing;

dispatching said first gesture whereby said first gesture will be received by said underlying application; and enabling said step of capturing.

17. The method of claim 16 in wherein said step of performing said second gesture comprises:

creating said second gesture as a long tap consisting of a move to said (x',y') when the distance between said (x',y') and said (swipeX,swipeY) is less than or equal to a second constant;
creating said second gesture as a scroll consisting of a path from said (x',y') to said (swipeX,swipeY) when said distance between said (x',y') and said (swipeX, swipeY) is greater than said second constant;
setting said (swipeX,swipeY) to (−1,−1);
disabling said step of capturing; dispatching said second gesture whereby said second gesture will be received by said underlying application; and
enabling said step of capturing.

18. The method of claim 17 wherein said step of performing said third gesture comprises:
creating said third gesture as a zoom/rotate consisting of a move to said (x',y') and a path from said (swipeX, swipeY) to said (zoomX,zoomY);
setting said (swipeX,swipeY) to (−1,−1);
setting said (zoomX,zoomY) to (−1,−1);
disabling said step of capturing;
dispatching said third gesture whereby said third gesture will be received by said underlying application; and
enabling said step of capturing.

19. The method of claim 18 wherein said steps of disabling said step of capturing further includes:
destroying said translucent layer; and
displaying a replacement layer, further comprising:
displaying a first translucent view with corners (0,0) and (left2s,top);
displaying a second translucent view with corners (0,bottom2s) and (left,h);
displaying a third translucent view with corners (right2s, bottom) and (w,h); and
displaying a fourth translucent view with corners (right,0) and (w,top2s);
whereby said views capture said motion events but leave a hole centered on said (x',y'), thereby allowing said steps of dispatching said gestures, composed in part from said (x',y'), to be received by said underlying application.

20. The method of claim 19 wherein said steps of enabling said step of capturing further includes:
destroying said replacement layer; and
redisplaying said translucent layer;
thereby providing visual indicators of said (x',y') and of said mode value, and thereby preventing said motion events from being received by said underlying application.

21. A method for dispatching gestures on behalf of a motion-disabled user assisted by an accessory with at least a first button for a touchscreen device having a pixel display and visible coordinate range w by h pixels, wherein w defines the width of the pixel display and h defines the height of the pixel display and having a processor running an underlying application and running an extra software layer, said method carried out by said extra software layer including the steps of:
Initializing coordinate values: (x',y'), (swipeX,swipeY), (zoomX,zoomY) , and distance values: sx, sy, and mode value;
computing, based on said (x',y'), said sx, said sy, said h and said w, updated values for top as max(y'−sy,0), left as max(x'−sx,0), bottom as min(y'+sy,h), right as min (x'+sx,w), top2s as max(y'+sy,0), left2s as max(x'+sx, 0), bottom2s as min(y'−sy,h) and right2s as min(x'−sy, w);

displaying on said touchscreen a translucent layer, in response to changes in said (x',y') and said mode value, including the steps of:
displaying a digit near said (x',y'), wherein said digit corresponds to the integer value of said mode value;
displaying an arrow form said (swipeX,swipeY) to said (x',y') when said mode value equals 2 and said swipeX does not equal −1;
displaying an arrow from said (zoomX,zoomY) to said (x',y') when said mode value equals 3 and said zoomX does not equal −1 and said swipeX equals −1;
displaying a pivot symbol and an arrow from said (zoomX,zoomY) to said (swipeX,swipeY) when said mode value equals 3 and said zoomX does not equal −1 and said swipeX does not equal −1, wherein the size of said pivot symbol is a logarithmic function involving said (x',y'), said (zoomX,zoomY) and said (swipeX, swipeY);
displaying a first translucent rectangle with corners (0,0) and (left2s,top) that captures said motion events, whereby the visual appearance of said first translucent rectangle is based on said mode value;
displaying a second translucent rectangle with corners (0,bottom2s) and (left,h) that captures said motion events, whereby the visual appearance of said second translucent rectangle is based on said mode value;
displaying a third translucent rectangle with corners (right2s,bottom) and (w,h) that captures said motion events, whereby the visual appearance of said third translucent rectangle is based on said mode value;
displaying a fourth translucent rectangle with corners (right,0) and (w,top2s) that captures said motion events, whereby the visual appearance of said fourth translucent rectangle is based on said mode value; and
displaying a fifth transparent rectangle with corners (right, top) and (left2s,bottom2s) whose capturing of said motion events can be enabled and disabled;
adjusting said (x',y') by the product of a constant and a vector difference between coordinates of the two most recent of said motion events obtained by said step of capturing;
changing said mode value, thereby yielding a new value of said mode value, in response to a request from said user;
selecting one of the following steps when said user pushes said first button:
saving said (x',y') as said (swipeX,swipeY) when said mode value equals 2and said swipeX equals −1;
saving said (x',y') as said (zoomX,zoomY) when said mode value equals 3and said zoomX equals −1;
saving said (x',y') as said (swipeX,swipeY) when said mode value equals 3and said zoomX does not equal −1 and said swipeX equals −1;
otherwise performing the following steps:
creating a gesture based one of the following:
said (x',y') if said mode value equals 1;
said (x',y') and said (swipeX,swipeY) if said mode value equals 2;
said (x',y'), said (swipeX,swipeY) and said (zoomX, zoomY) if said mode value equals 3;
setting said (swipeX,swipeY) and said (zoomX, zoomY) to (−1,−1);

disabling said capturing by said fifth transparent rectangle;
dispatching said gesture, whereby said gesture will be received by said underlying application; and
enabling said capturing by said fifth transparent rectangle.

\* \* \* \* \*